United States Patent
Honda et al.

(10) Patent No.: US 9,728,393 B2
(45) Date of Patent: *Aug. 8, 2017

(54) TARGET FOR ULTRAVIOLET LIGHT GENERATION, ELECTRON BEAM-EXCITED ULTRAVIOLET LIGHT SOURCE, AND PRODUCTION METHOD FOR TARGET FOR ULTRAVIOLET LIGHT GENERATION

(71) Applicant: HAMAMATSU PHOTONICS K.K., Hamamatsu-shi, Shizuoka (JP)

(72) Inventors: Yoshinori Honda, Hamamatsu (JP); Hiroyuki Taketomi, Hamamatsu (JP); Fumitsugu Fukuyo, Hamamatsu (JP); Koji Kawai, Hamamatsu (JP); Hidetsugu Takaoka, Hamamatsu (JP); Takashi Suzuki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 2 days.

This patent is subject to a terminal disclaimer.

(21) Appl. No.: 14/437,236

(22) PCT Filed: Sep. 6, 2013

(86) PCT No.: PCT/JP2013/074127
§ 371 (c)(1),
(2) Date: Apr. 21, 2015

(87) PCT Pub. No.: WO2014/065027
PCT Pub. Date: May 1, 2014

(65) Prior Publication Data
US 2015/0287587 A1 Oct. 8, 2015

(30) Foreign Application Priority Data

Oct. 23, 2012 (JP) .................. 2012-233976

(51) Int. Cl.
*H01J 63/06* (2006.01)
*C09K 11/77* (2006.01)
(Continued)

(52) U.S. Cl.
CPC .............. *H01J 63/06* (2013.01); *B05D 5/061* (2013.01); *C09K 11/7774* (2013.01); *H01J 9/221* (2013.01); *C09K 2211/1416* (2013.01)

(58) Field of Classification Search
CPC .......... H01J 63/06; G01J 1/429; G01N 21/64; B05D 5/061
See application file for complete search history.

(56) References Cited

U.S. PATENT DOCUMENTS 4,809,293 A * 2/1989 DeBell .................. H01S 3/034
372/101
5,399,499 A * 3/1995 Paz-Pujalt ................ G01J 3/10
250/504 R
(Continued)

FOREIGN PATENT DOCUMENTS

CN 101409963 4/2009
CN 101842869 9/2010
(Continued)

OTHER PUBLICATIONS

Zorenko, Yu, et al., "Development of novel UV emitting single crystalline film scintillators," Journal of Physics, vol. 289, No. 1, May 6, 2011, p. 12029, XP020189368.
(Continued)

*Primary Examiner* — Marcus Taningco
(74) *Attorney, Agent, or Firm* — Drinker Biddle & Reath LLP

(57) ABSTRACT

A target for ultraviolet light generation comprises a substrate adapted to transmit ultraviolet light therethrough and a light-emitting layer disposed on the substrate and generating
(Continued)

ultraviolet light UV in response to an electron beam. The light-emitting layer includes a powdery or granular rare-earth-containing aluminum garnet crystal doped with an activator. The light-emitting layer has an ultraviolet light emission peak wavelength of 300 nm or shorter.

12 Claims, 30 Drawing Sheets

(51) Int. Cl.
    *B05D 5/06*     (2006.01)
    *H01J 9/22*     (2006.01)

(56) References Cited

U.S. PATENT DOCUMENTS

| | | | | |
|---|---|---|---|---|
| 9,240,313 | B2* | 1/2016 | Honda | H01J 63/06 |
| 9,318,312 | B2* | 4/2016 | Honda | H01J 63/02 |
| 2003/0173542 | A1 | 9/2003 | Fukuta et al. | |
| 2010/0289435 | A1* | 11/2010 | Kita | C09K 11/0883 |
| | | | | 315/363 |

FOREIGN PATENT DOCUMENTS

| | | |
|---|---|---|
| EP | 1 271 617 | 1/2003 |
| JP | 2002-033080 | 1/2002 |
| JP | 2006-520836 A | 9/2006 |
| JP | 2007-077280 | 3/2007 |
| JP | 2009-227794 A | 10/2009 |
| JP | 2013-053257 A | 3/2013 |
| JP | 2013-535527 A | 9/2013 |
| WO | WO-2006/049284 A1 | 5/2006 |
| WO | WO 2009/138682 | 11/2009 |
| WO | WO-2012/006774 A1 | 1/2012 |
| WO | WO-2012/147744 A1 | 11/2012 |

OTHER PUBLICATIONS

International Preliminary Report on Patentability dated Apr. 28, 2015 for PCT/JP2013/074127.

Setlur, A.A., et al., "The Nature of $Bi^{3+}$ Luminescence in Garnet Hosts," Optical Materials, vol. 29, Jan. 4, 2006, pp. 410-415.

Murk, V., et al., "Photoluminescence of $Y_3Al_5O_{12}$:Sc Crystals," Phys. Stat. Sol., vol. 181, Jan. 1, 1994, pp. K37-K40.

Zorenko, Y., et al., "Luminescence Centers in $Y_3Al_5O_{12}$:La Single Crystals," Journal Physics: Conference Series, vol. 289, Dec. 31, 2011. pp. 012028-1 to 012028-7.

Zorenko, Y, et al., "Novel UV-Emitting Single Crystalline Film Phosphors Grown by LPE Method," Radiation Measurements, vol. 45, Oct. 15, 2009, pp. 444-448.

\* cited by examiner

Fig.3

| Base material | Activator | Light emission peak wavelength [nm] |
|---|---|---|
| LuAG ($Lu_3Al_5O_{12}$) | La | 265 |
| | Sc | 265 |
| | Bi | 297 |
| YAG ($Y_3Al_5O_{12}$) | La | 297 |
| | Sc | — |

Fig. 9
(a)
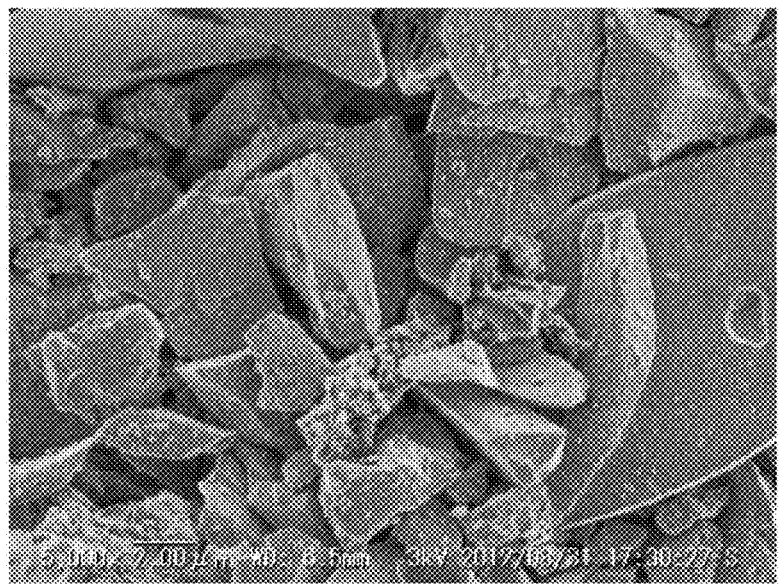
(b)

Fig. 10
(a)
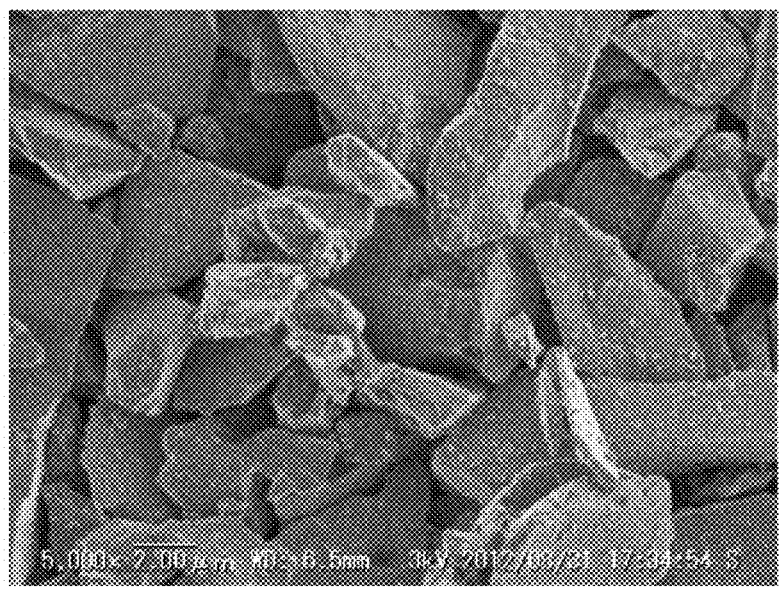
(b)
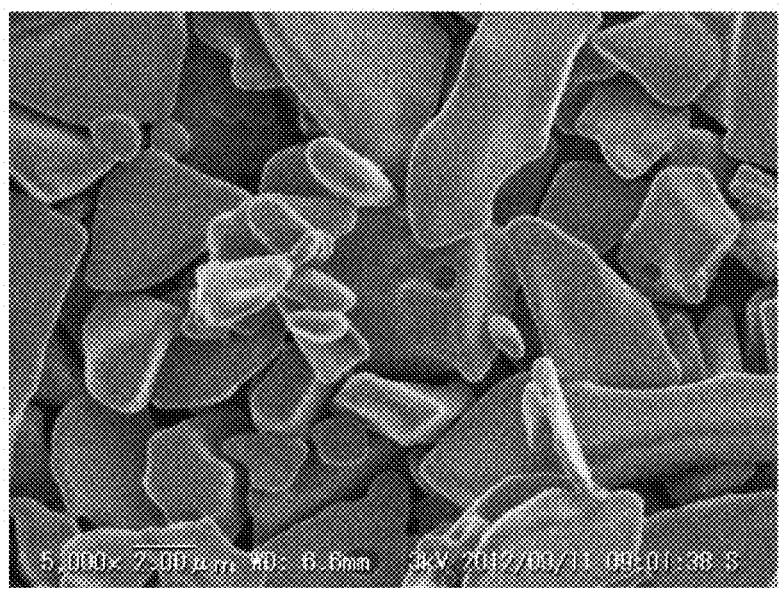

Fig. 11
(a)
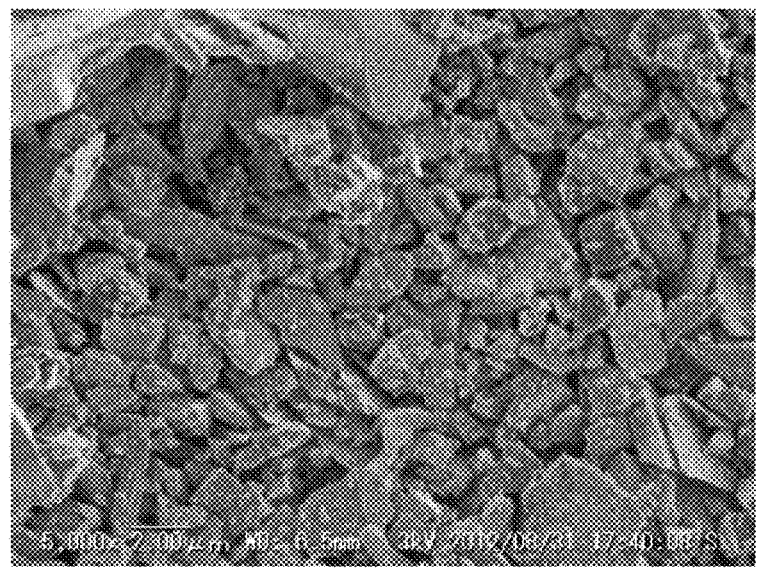
(b)
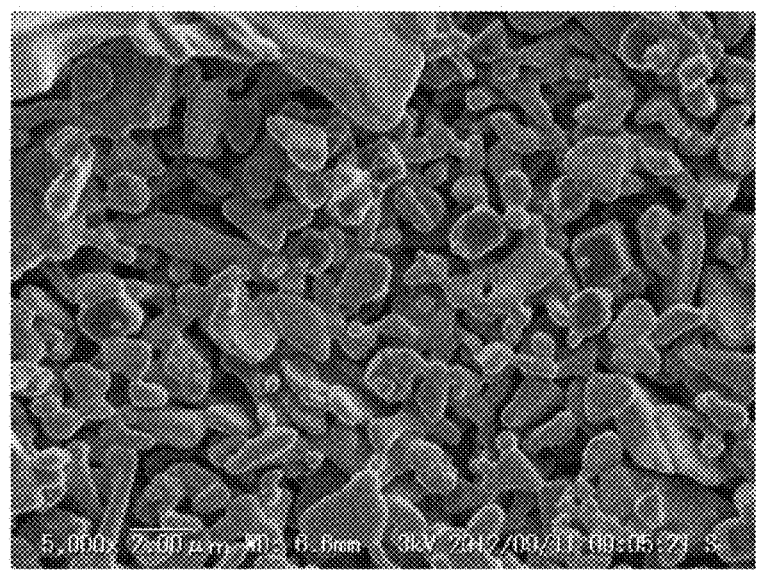

Fig. 12
(a)
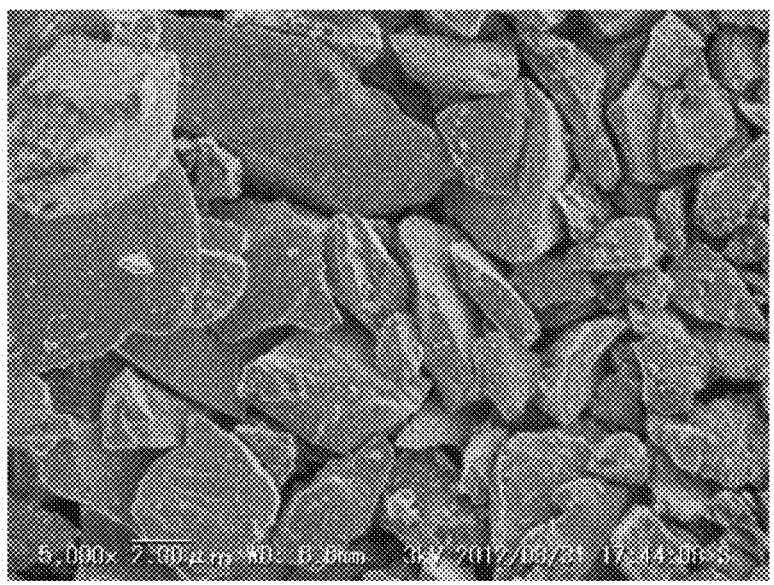
(b)
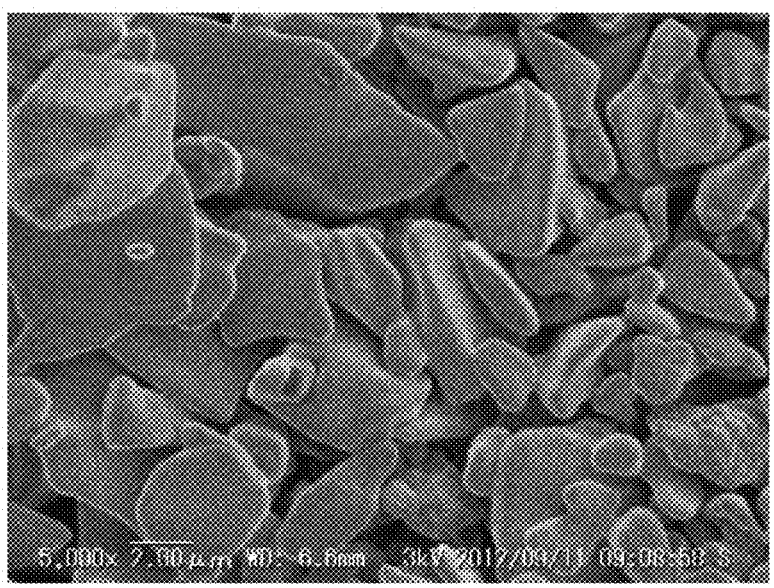

Fig. 13
(a)
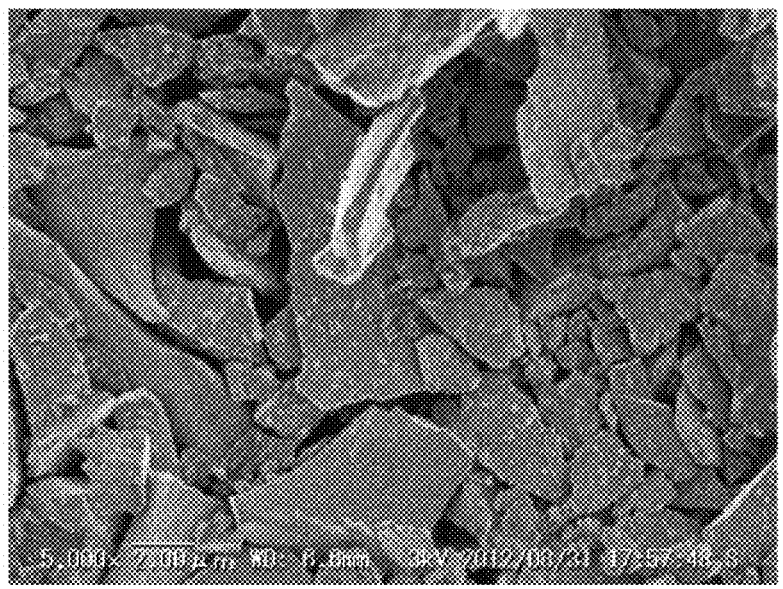
(b)
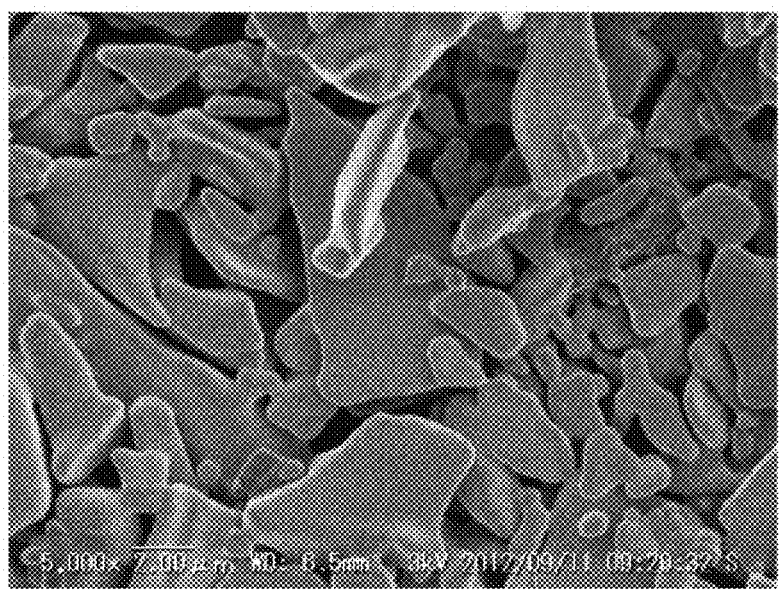

Fig. 14
(a)
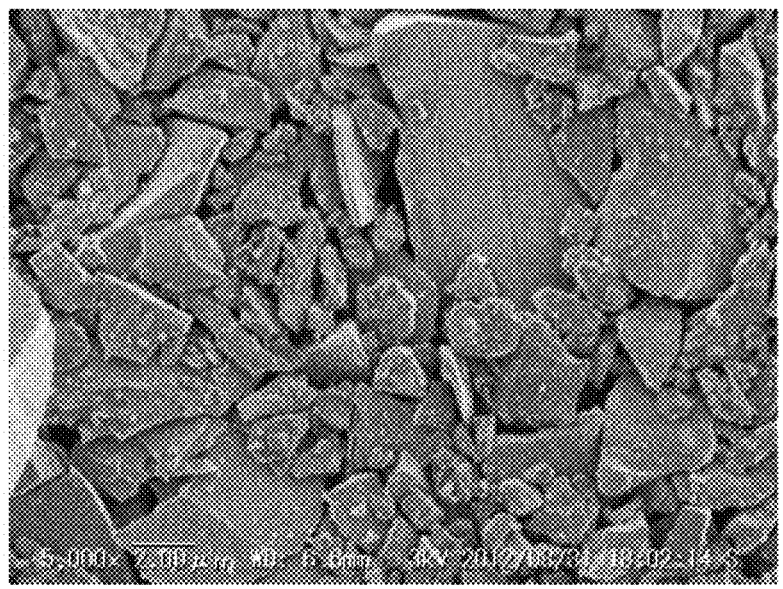
(b)
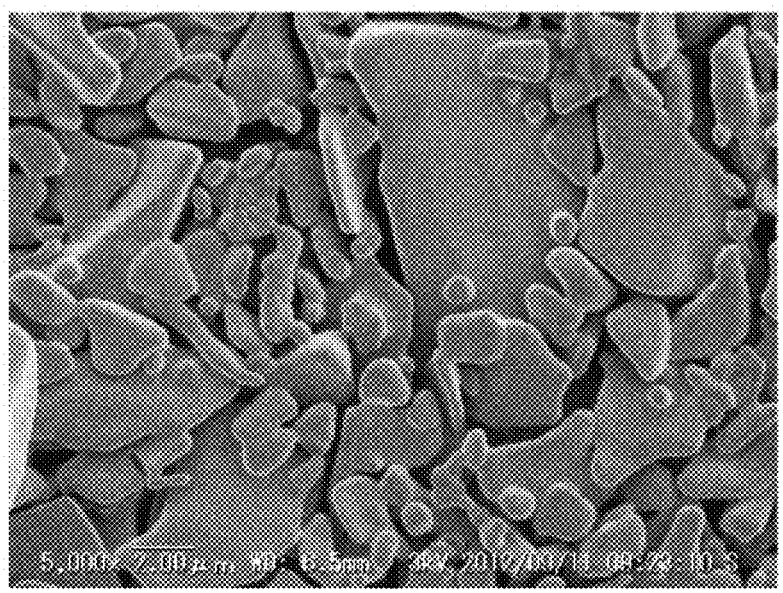

Fig. 15
(a)
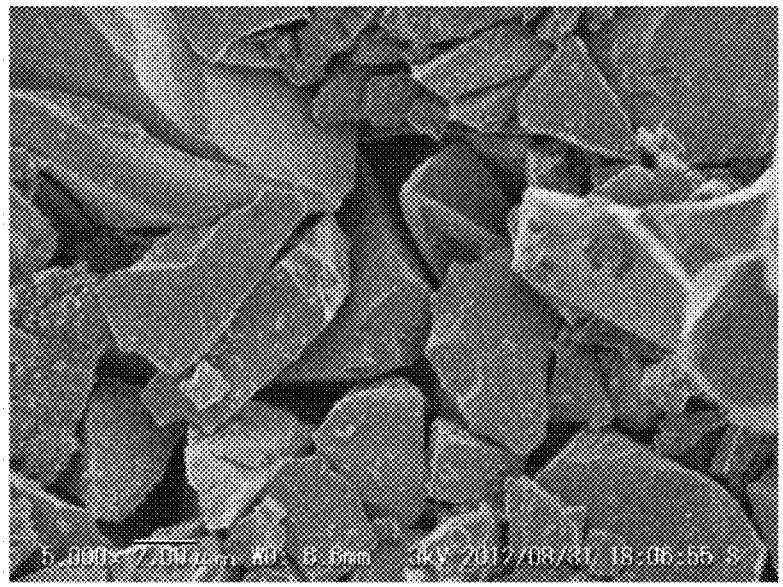
(b)
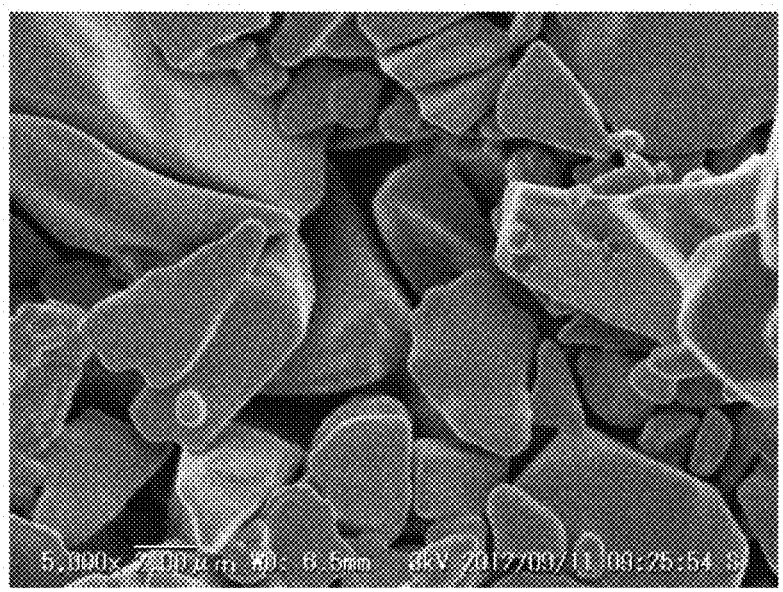

Fig. 16
(a)
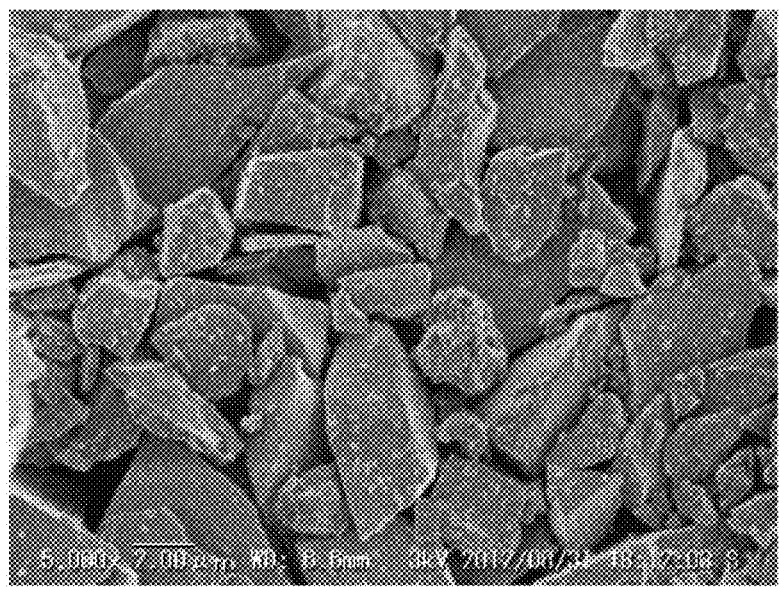
(b)
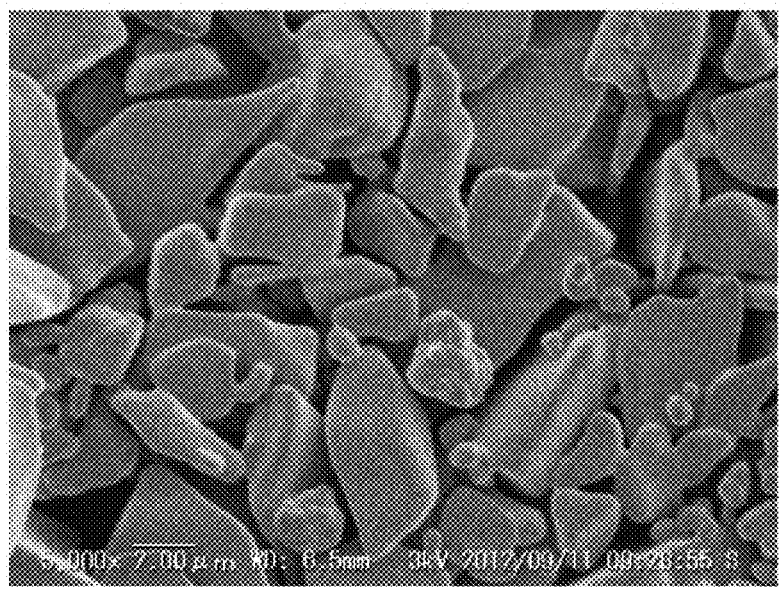

Fig. 17
(a)
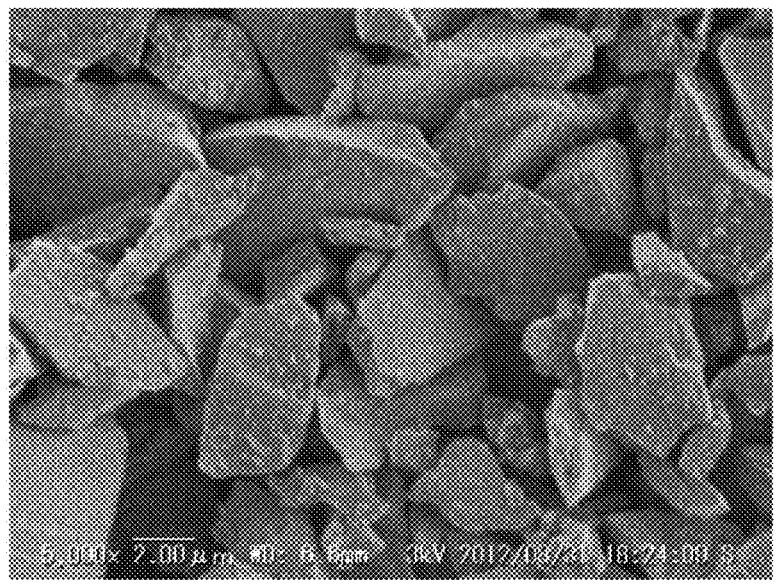
(b)
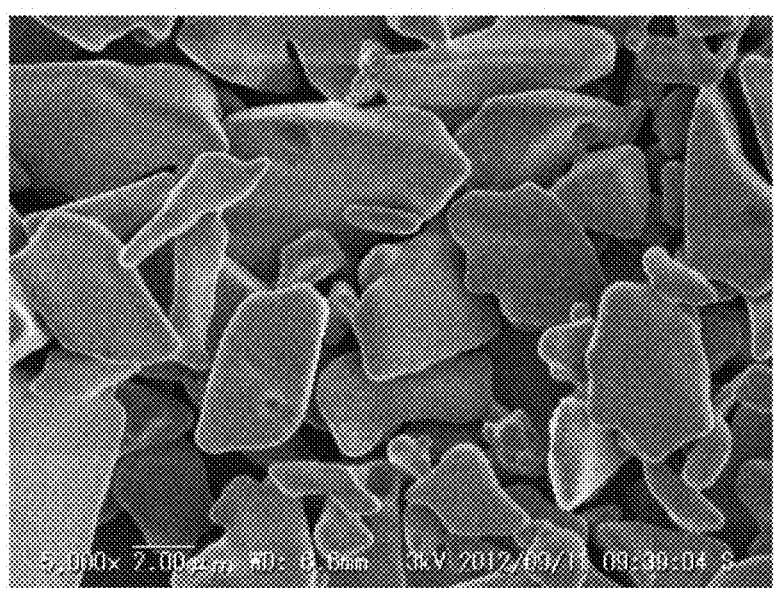

Fig. 18
(a)
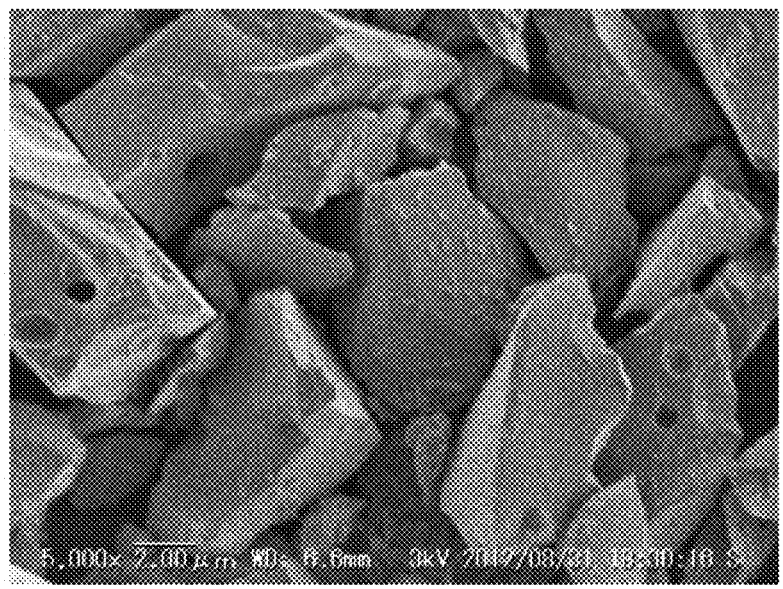
(b)
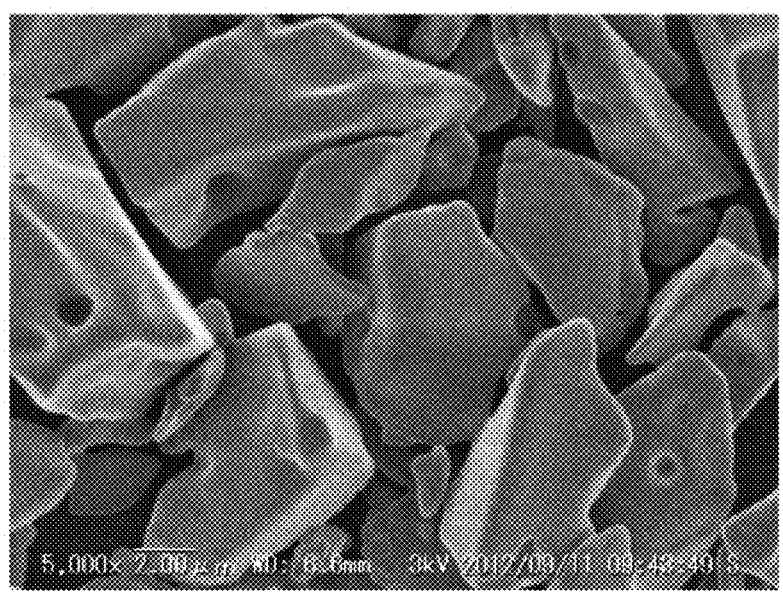

Fig. 19
(a)
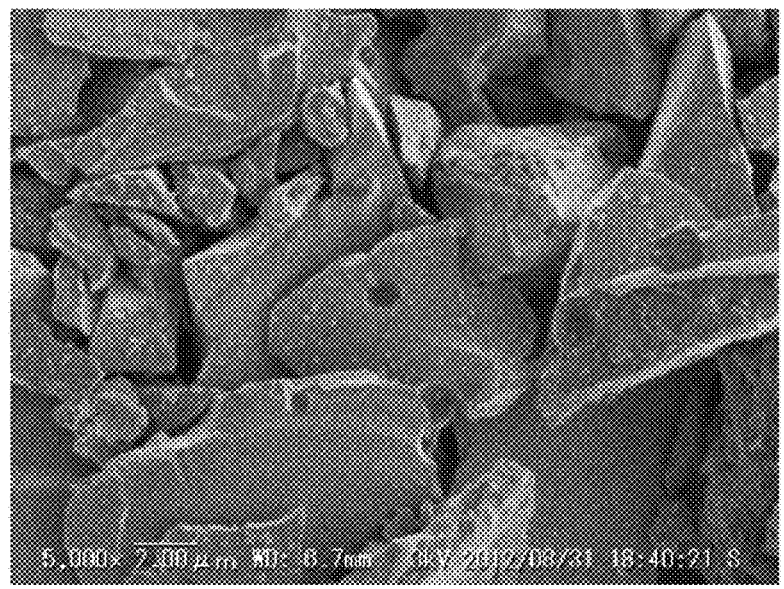
(b)
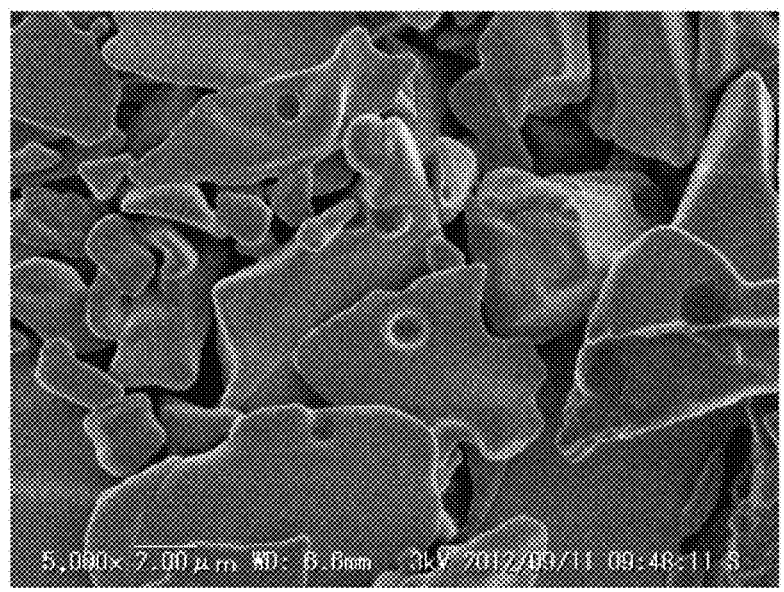

Fig. 20
(a)
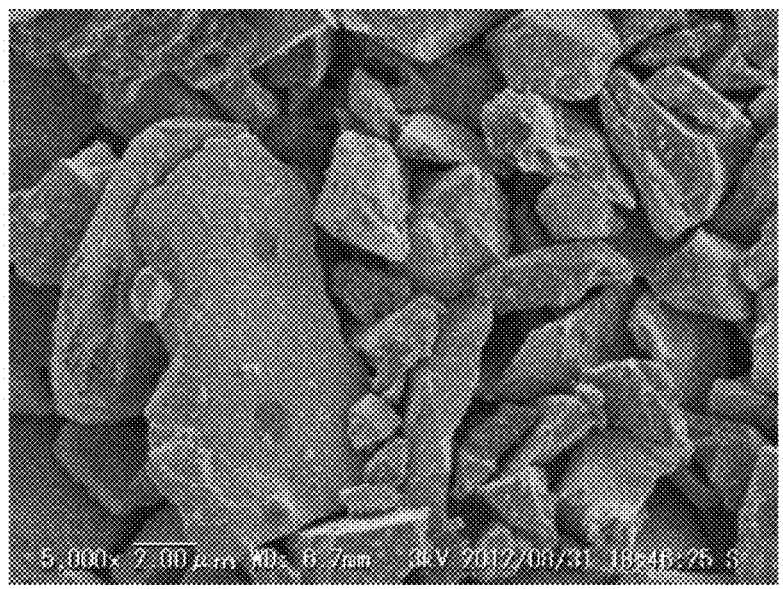
(b)
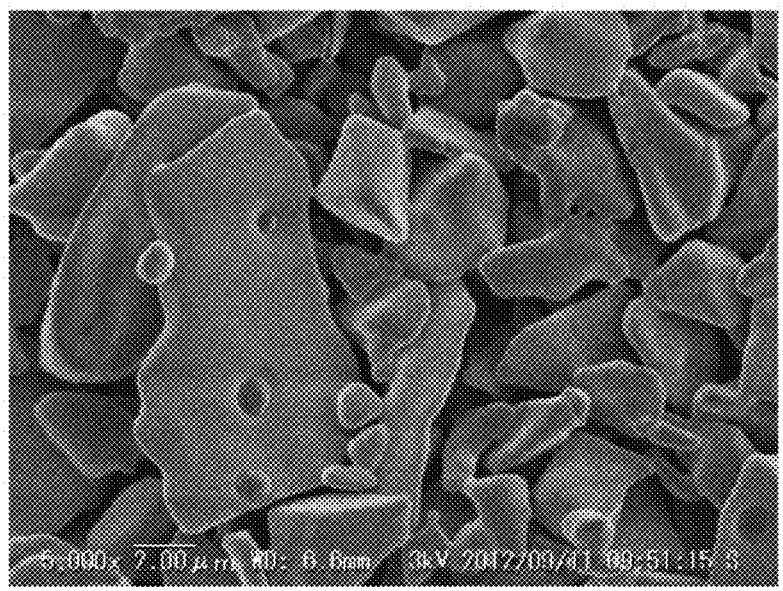

Fig. 21
(a)
(b)
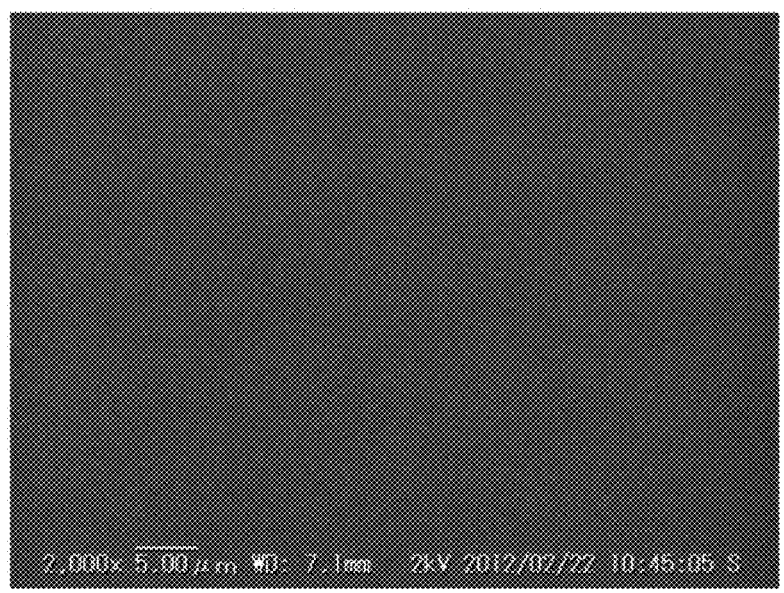

Fig. 22
(a)
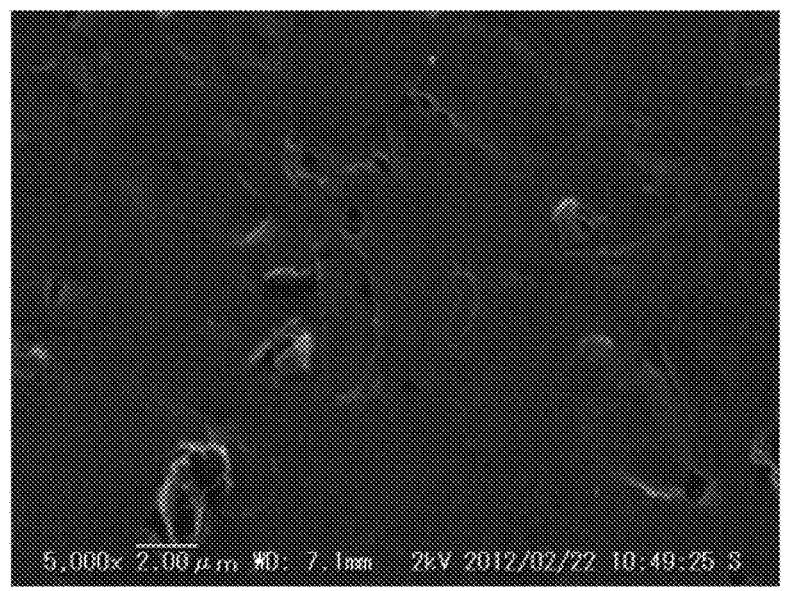
(b)
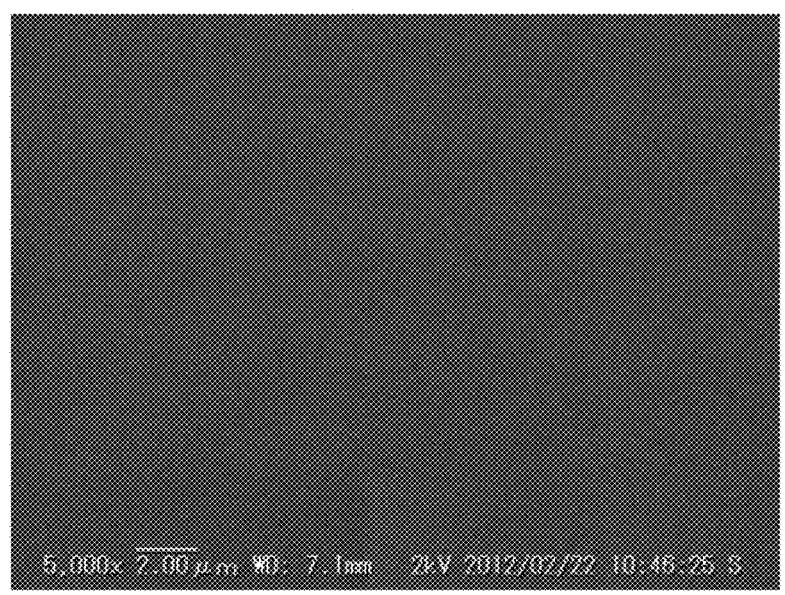

Fig.29
(a)
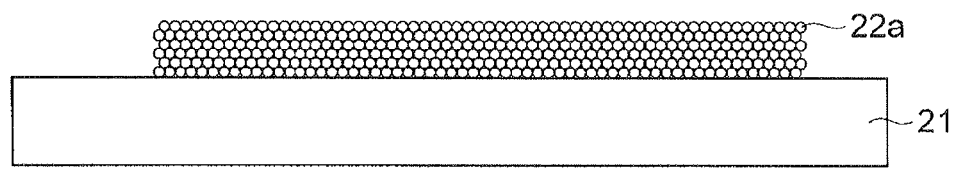
(b)
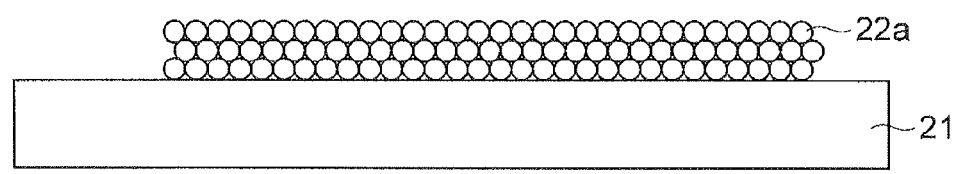
(c)
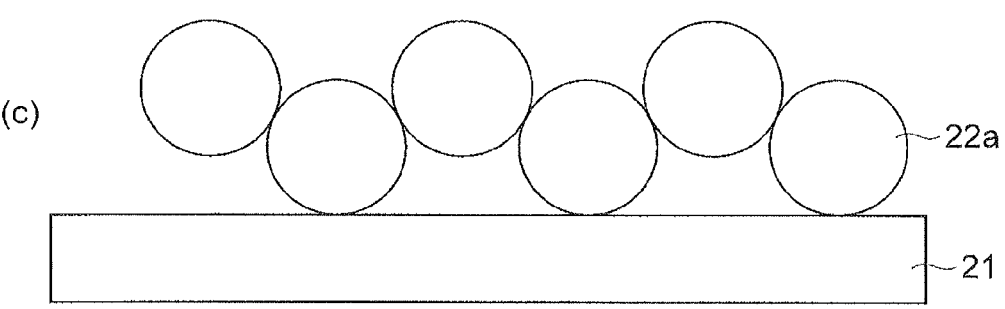

TARGET FOR ULTRAVIOLET LIGHT GENERATION, ELECTRON BEAM-EXCITED ULTRAVIOLET LIGHT SOURCE, AND PRODUCTION METHOD FOR TARGET FOR ULTRAVIOLET LIGHT GENERATION

TECHNICAL FIELD

One aspect of the present invention relates to a target for ultraviolet light generation, an electron-beam-excited ultraviolet light source, and a method for manufacturing a target for ultraviolet light generation.

BACKGROUND ART

Patent Literature 1 describes the use of a single crystal containing praseodymium (Pr) as a material for a scintillator employed in PET devices. Patent Literature 2 discloses a technique concerning an illumination system in which a wavelength of light emitted from a light-emitting diode is converted by a phosphor so as to attain white light.

CITATION LIST

Patent Literature

Patent Literature 1: International Publication No. 2006/049284 pamphlet
Patent Literature 2: Japanese Translated International Application Laid-Open No. 2006-520836

SUMMARY OF INVENTION

Technical Problem

Electron tubes such as mercury-xenon lamps and deuterium lamps have conventionally been used as ultraviolet light sources. However, these ultraviolet light sources are low in light emission efficiency and large in size and have problems in terms of stability and life. When a mercury-xenon lamp is used, there is a fear of mercury affecting the environment. On the other hand, electron-beam-excited ultraviolet light sources equipped with a structure for exciting ultraviolet light by irradiating a target with an electron beam have been known as another type of ultraviolet light sources. The electron-beam-excited ultraviolet light sources are expected to become light sources in the field of optical measurement taking advantage of their high stability, for sterilization and disinfection making use of their low power consumption, or for medical care and biochemistry utilizing their high wavelength selectivity. The electron-beam-excited ultraviolet light sources also have a merit that their power consumption is lower than that of mercury lamps and the like.

Light-emitting diodes which can output light in the ultraviolet region such as one having a wavelength of 360 nm or shorter have recently been developed. However, such light-emitting diodes still have low output light intensity and are hard to increase their light-emitting area, thus leaving a problem that their uses are limited. By contrast, the electron-beam-excited ultraviolet light sources can generate ultraviolet light with sufficient intensity and are able to output ultraviolet light having uniform intensity with a large area by increasing the diameter of the electron beam irradiating the target.

However, the electron-beam-excited ultraviolet light sources are also demanded to improve their ultraviolet light generation efficiency further. It is an object of one aspect of the present invention to provide a target for ultraviolet light generation, an electron-beam-excited ultraviolet light source, and a method for manufacturing a target for ultraviolet light generation, which can enhance the ultraviolet light generation efficiency.

Solution to Problem

For solving the problems mentioned above, the target for ultraviolet light generation in accordance with one aspect of the present invention comprises a substrate adapted to transmit ultraviolet light therethrough and a light-emitting layer disposed on the substrate and generating ultraviolet light in response to an electron beam, the light-emitting layer including a powdery or granular rare-earth-containing aluminum garnet crystal doped with an activator, the light-emitting layer having an ultraviolet light emission peak wavelength of 300 nm or shorter.

The inventors thought of using a rare-earth-containing aluminum garnet crystal doped with an activator as a target for ultraviolet light generation. However, it has turned out that the methods described in the prior art literature are hard to yield sufficient ultraviolet light generation efficiency. In contrast, as a result of tests and studies conducted by the inventors, it has been found that the ultraviolet light generation efficiency can remarkably be enhanced when a rare-earth-containing aluminum garnet crystal doped with an activator is turned into a powdery or granular form and then shaped into a film. That is, the target for ultraviolet light generation in accordance with one aspect of the present invention has a light-emitting layer including a powdery or granular rare-earth-containing aluminum garnet crystal doped with an activator and thus can effectively enhance the ultraviolet light generation efficiency.

In the target for ultraviolet light generation, the rare-earth-containing aluminum garnet crystal may have a surface covered with a melted crystal layer resolidified after being melted by heat treatment. This fuses rare-earth-containing aluminum garnet crystals to each other and to the substrate, so as to enable the light-emitting layer to attain sufficient mechanical strength without using binders, while enhancing the bonding strength between the light-emitting layer and substrate, whereby the light-emitting layer can be restrained from peeling.

In the target for ultraviolet light generation, the activator may be a rare-earth element. In the target for ultraviolet light generation, the rare-earth-containing aluminum garnet crystal may be LuAG, the activator being at least one of scandium (Sc), lanthanum (La), and bismuth (Bi). In the target for ultraviolet light generation, the rare-earth-containing aluminum garnet crystal may be YAG, the activator being at least one of Sc and La. Any of them can favorably attain a light-emitting layer having an ultraviolet light emission peak wavelength of 300 nm or shorter.

In the target for ultraviolet light generation, the light-emitting layer may have a thickness of at least 0.5 μm but not more than 30 μm. According to tests and studies conducted by the inventors, the light-emitting layer having such a thickness can enhance the ultraviolet light emission efficiency more effectively.

In the target for ultraviolet light generation, the rare-earth-containing aluminum garnet crystal may have a median diameter of at least 0.5 μm but not more than 30 μm. According to tests and studies conducted by the inventors, the light-emitting layer having such a particle size can enhance the ultraviolet light emission efficiency more effectively.

In the target for ultraviolet light generation, the melted crystal layer may fuse rare-earth-containing aluminum garnet crystals to each other and to the substrate.

In the target for ultraviolet light generation, the substrate may be constituted by sapphire, silica, or rock crystal. This enables the substrate to transmit ultraviolet light therethrough and endure the temperature of heat treatment of the light-emitting layer.

The electron-beam-excited ultraviolet light source in accordance with one aspect of the present invention comprises any of the targets for ultraviolet light generation mentioned above and an electron source providing the target with the electron beam. This electron-beam-excited ultraviolet light source can enhance the ultraviolet light generation efficiency by having any of the targets for ultraviolet light generation mentioned above.

The method for manufacturing a target for ultraviolet light generation in accordance with one aspect of the present invention comprises depositing a powdery or granular rare-earth-containing aluminum garnet crystal, doped with an activator, having an ultraviolet light emission peak wavelength of 300 nm or shorter on a substrate adapted to transmit ultraviolet light therethrough and heat-treating the rare-earth-containing aluminum garnet crystal, so as to melt and then resolidify a surface of the rare-earth-containing aluminum garnet crystal to form a melted crystal layer. According to this method for manufacturing a target for ultraviolet light generation, the melted crystal layer fuses rare-earth-containing aluminum garnet crystals to each other and to the substrate, so as to enable the light-emitting layer to attain sufficient mechanical strength without using binders, while enhancing the bonding strength between the light-emitting layer and substrate, whereby the light-emitting layer can be restrained from peeling. In this manufacturing method, the heat-treatment temperature may be at least 1400° C. but not higher than 2000° C.

Advantageous Effects of Invention

The target for ultraviolet light generation, electron-beam-excited ultraviolet light source, and method for manufacturing a target for ultraviolet light generation in accordance with one aspect of the present invention can enhance the ultraviolet light generation efficiency.

BRIEF DESCRIPTION OF DRAWINGS

FIG. 3 is a chart listing specific examples of a rare-earth-containing aluminum garnet crystal doped with an activator, which is usable in a light-emitting layer 22 of the embodiment;

FIG. 9 is an SEM photograph capturing a state of crystal particles (Sc:LuAG crystal particles) in an active layer after heat treatment when the activator is Sc;

FIG. 10 is an SEM photograph capturing a state of crystal particles (Sc:LuAG crystal particles) in an active layer after heat treatment when the activator is Sc;

FIG. 11 is an SEM photograph capturing a state of crystal particles (Sc:LuAG crystal particles) in an active layer after heat treatment when the activator is Sc;

FIG. 12 is an SEM photograph capturing a state of crystal particles (Sc:LuAG crystal particles) in an active layer after heat treatment when the activator is Sc;

FIG. 13 is an SEM photograph capturing a state of crystal particles (La:LuAG crystal particles) in an active layer after heat treatment when the activator is La;

FIG. 14 is an SEM photograph capturing a state of crystal particles (La:LuAG crystal particles) in an active layer after heat treatment when the activator is La;

FIG. 15 is an SEM photograph capturing a state of crystal particles (La:LuAG crystal particles) in an active layer after heat treatment when the activator is La;

FIG. 16 is an SEM photograph capturing a state of crystal particles (La:LuAG crystal particles) in an active layer after heat treatment when the activator is La;

FIG. 17 is an SEM photograph capturing a state of crystal particles (Bi:LuAG crystal particles) in an active layer after heat treatment when the activator is Bi;

FIG. 18 is an SEM photograph capturing a state of crystal particles (Bi:LuAG crystal particles) in an active layer after heat treatment when the activator is Bi;

FIG. 19 is an SEM photograph capturing a state of crystal particles (Bi:LuAG crystal particles) in an active layer after heat treatment when the activator is Bi;

FIG. 20 is an SEM photograph capturing a state of crystal particles (Bi:LuAG crystal particles) in an active layer after heat treatment when the activator is Bi;

FIG. 21 is an SEM photograph capturing a surface of a sapphire substrate after peeling a light-emitting layer including Pr:LuAG crystal particles;

FIG. 22 is an SEM photograph capturing a surface of a sapphire substrate after peeling a light-emitting layer including Pr:LuAG crystal particles;

FIG. 29 is a diagram schematically illustrating Pr:LuAG crystal particles deposited on a substrate.

DESCRIPTION OF EMBODIMENTS

In the following, embodiments of the target for ultraviolet light generation, electron-beam-excited ultraviolet light source, and method for manufacturing a target for ultraviolet light generation in accordance with one aspect of the present invention will be explained in detail with reference to the drawings. In the explanation of the drawings, the same constituents will be referred to with the same signs while omitting their overlapping descriptions.

Figure 1:
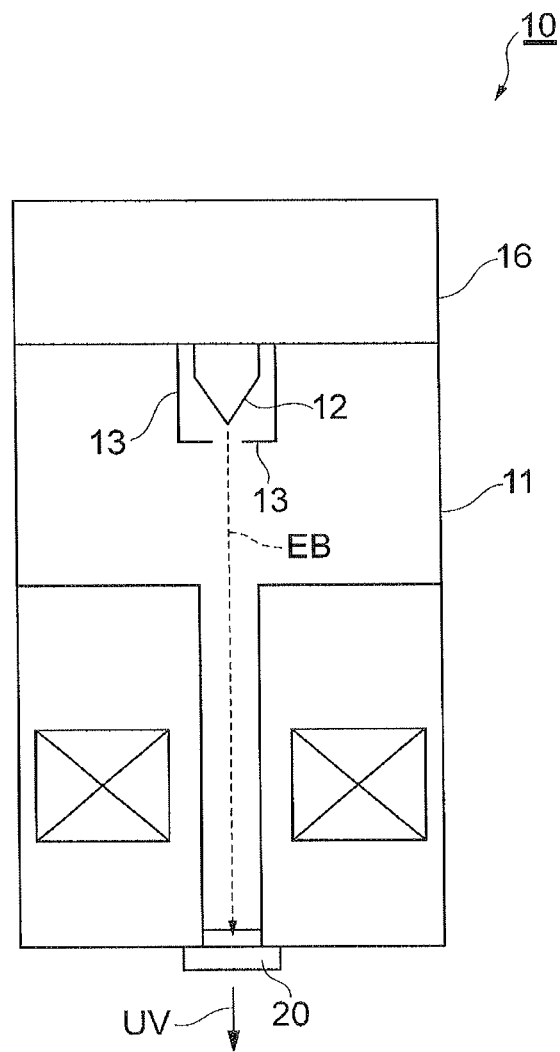
FIG. 1 is a schematic view illustrating an inner structure of the electron-beam-excited ultraviolet light source in accordance with an embodiment.

FIG. 1 is a schematic view illustrating an inner structure of an electron-beam-excited ultraviolet light source 10 in accordance with an embodiment. In this electron-beam-excited ultraviolet light source 10, as illustrated in FIG. 1, an electron source 12 and an extraction electrode 13 are arranged on the upper end side within a glass envelope (electron tube) 11 evacuated under vacuum. When an appropriate extraction voltage is applied between the electron source 12 and extraction electrode 13 from a power supply part 16, an electron beam EB accelerated by a high voltage is emitted from the electron source 12. As the electron source 12, one emitting an electron beam having a large area (e.g., cold cathodes such as carbon nanotubes or hot cathodes) can be used.

A target 20 for ultraviolet light generation is arranged on the lower end side within the envelope 11. The target 20 is set to the ground potential, for example, while a high negative voltage is applied from the power supply part 16 to the electron source 12. As a consequence, the target 20 is irradiated with the electron beam EB emitted from the electron source 12. The target 20 is excited in response to the electron beam EB and generates ultraviolet light UV having an ultraviolet light emission peak wavelength of 300 nm or shorter.

Figure 2:
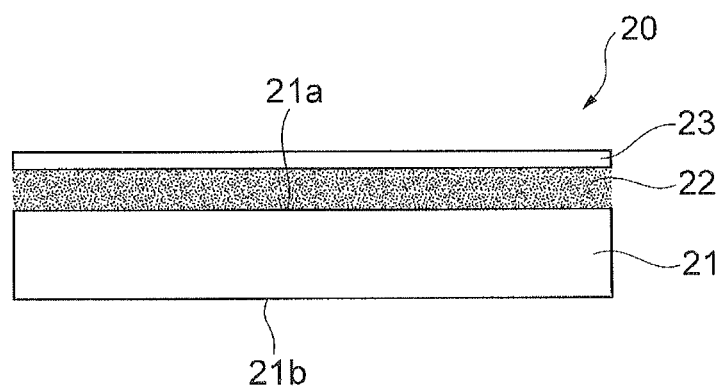
FIG. 2 is a side view illustrating a structure of a target for ultraviolet light generation.

FIG. 2 is a side view illustrating a structure of the target 20. As illustrated in FIG. 2, the target 20 comprises a substrate 21, a light-emitting layer 22 disposed on the substrate 21, and an aluminum film 23 provided on the light-emitting layer 22. The substrate 21 is a planar member made of a material adapted to transmit ultraviolet light (one having a wavelength of 300 nm or shorter in particular) therethrough, an example of which is constituted by sapphire ($Al_2O_3$), silica ($SiO_2$), or rock crystal (crystal of silicon oxide). The substrate 21 has a principal surface 21a and a rear face 21b. A preferred thickness of the substrate 21 is at least 0.1 mm but not more than 10 mm.

The light-emitting layer 22 is excited in response to the electron beam EB illustrated in FIG. 1 and generates the ultraviolet light UV having a wavelength of 300 nm or shorter. The light-emitting layer 22 includes a powdery or granular rare-earth-containing aluminum garnet crystal doped with an activator. Preferred examples of the rare-earth-containing aluminum garnet crystal include $Lu_3Al_5O_{12}$ (LuAG) and $Y_3Al_5O_{12}$ (YAG). Rare-earth elements are preferred as the activator. When the rare-earth-containing aluminum garnet crystal is LuAG, at least one of scandium (Sc), lanthanum (La), and bismuth (Bi) is preferred as the activator. When the rare-earth-containing aluminum garnet crystal is YAG, at least one of Sc and La is preferred as the activator.

FIG. 3 is a chart listing specific examples of the rare-earth-containing aluminum garnet crystal doped with an activator which can be used in the light-emitting layer 22 of this embodiment. FIG. 3 illustrates ultraviolet light emission peak wavelengths (unit: nm) corresponding to combinations of activators and base materials. As illustrated in FIG. 3, examples of the rare-earth-containing aluminum garnet crystal doped with an activator include La:LuAG, Sc:LuAG, Bi:LuAG, La:YAG, and Sc:YAG. Their light emission peak wavelengths vary depending on the activator content.

Here, the rare-earth-containing aluminum garnet crystal included in the light-emitting layer 22 may be any of a single crystal, a polycrystal, and their mixture. Different kinds of the rare-earth-containing aluminum garnet crystal (e.g., LuAG and YAG) may be mixed, and different kinds of activator (e.g., at least two of La, Sc, and Bi) may be mixed.

As will be seen from examples to be explained later, the rare-earth-containing aluminum garnet crystal in the light-emitting layer 22 of this embodiment has a surface covered with a melted crystal layer resolidified after being melted by heat treatment. A preferred thickness of the light-emitting layer 22 is at least 0.5 µm but not more than 30 µm. A preferred median diameter of the light-emitting layer 22 is at least 0.5 µm but not more than 30 µm. The content of the activator included in the rare-earth-containing aluminum garnet crystal is preferably at least 0.05 atom % but not more than 2.0 atom %, more preferably at least 0.1 atom % but not more than 1.0 atom %.

Effects obtained by this embodiment will now be explained. As will be seen from examples to be explained later, it has been found out that turning a rare-earth-containing aluminum garnet crystal into a powdery or granular form and shaping it into a film can remarkably enhance the ultraviolet light generation efficiency as compared with the case using a planar rare-earth-containing aluminum garnet crystal. Since the light-emitting layer 22 includes the powdery or granular rare-earth-containing aluminum garnet crystal doped with an activator, the target 20 of this embodiment can effectively enhance the ultraviolet light generation efficiency. Such effects seem to result from the fact that turning the rare-earth-containing aluminum garnet crystal doped with an activator into a powdery or granular form increases the reaction area between the rare-earth-containing aluminum garnet crystal and the electron beam and enhances the light extraction efficiency.

Preferably, the rare-earth-containing aluminum garnet crystal has a surface covered with a melted crystal layer resolidified after being melted by heat treatment as in the target 20 in accordance with this embodiment. As will be seen from examples to be explained later, this fuses the rare-earth-containing aluminum garnet crystals to each other and the rare-earth-containing aluminum garnet crystal and the substrate 21 to each other, so as to enable the light-emitting layer 22 to attain sufficient mechanical strength without using binders, while enhancing the bonding strength between the light-emitting layer 22 and substrate 21, whereby the light-emitting layer 22 can be restrained from peeling.

Since the light-emitting layer 22 of this embodiment can be formed by such a method as depositing a powdery or granular oxide crystal on the substrate 21, the target 20 having a large area can be made easily.

The substrate 22 is preferably made of sapphire, silica, or rock crystal as in this embodiment. This enables the substrate 21 to transmit ultraviolet light therethrough and endure the temperature of heat treatment of the light-emitting layer 22.

As in this embodiment, the rare-earth-containing aluminum garnet crystal may be LuAG, the activator being at least one of Sc, La, and Bi. Alternatively, the rare-earth-containing aluminum garnet crystal may be YAG, the activator being at least one of Sc and La. Any of these can favorably attain the light-emitting layer 22 having an ultraviolet light emission peak wavelength of 300 nm or shorter.

First Example

The first example of the above-mentioned embodiment will now be explained. First, in this example, two sapphire substrates each having a diameter of 12 mm and a thickness of 2 mm were prepared. Subsequently, an La:LuAG monocrystalline substrate and an Sc:LuAG monocrystalline substrate were prepared, and these monocrystalline substrates were pulverized in a mortar, so as to turn La:LuAG and Sc:LuAG single crystals into a powdery or granular form. Then, the powdery or granular La:LuAG single crystal was deposited on one sapphire substrate by sedimentation, so as to form a light-emitting layer. The powdery or granular Sc:LuAG single crystal was deposited on the other sapphire substrate by sedimentation, so as to form another light-emitting layer. Thereafter, an organic film (nitrocellulose) was formed on these light-emitting layers, and an aluminum film was vapor-deposited on the organic film. Finally, each of the light-emitting layers was fired, so as to decompose and vaporize the organic film, thus yielding a structure in which the aluminum film was in contact with the light-emitting layer. The thickness of each light-emitting layer after firing was 10 μm.

Figure 4:
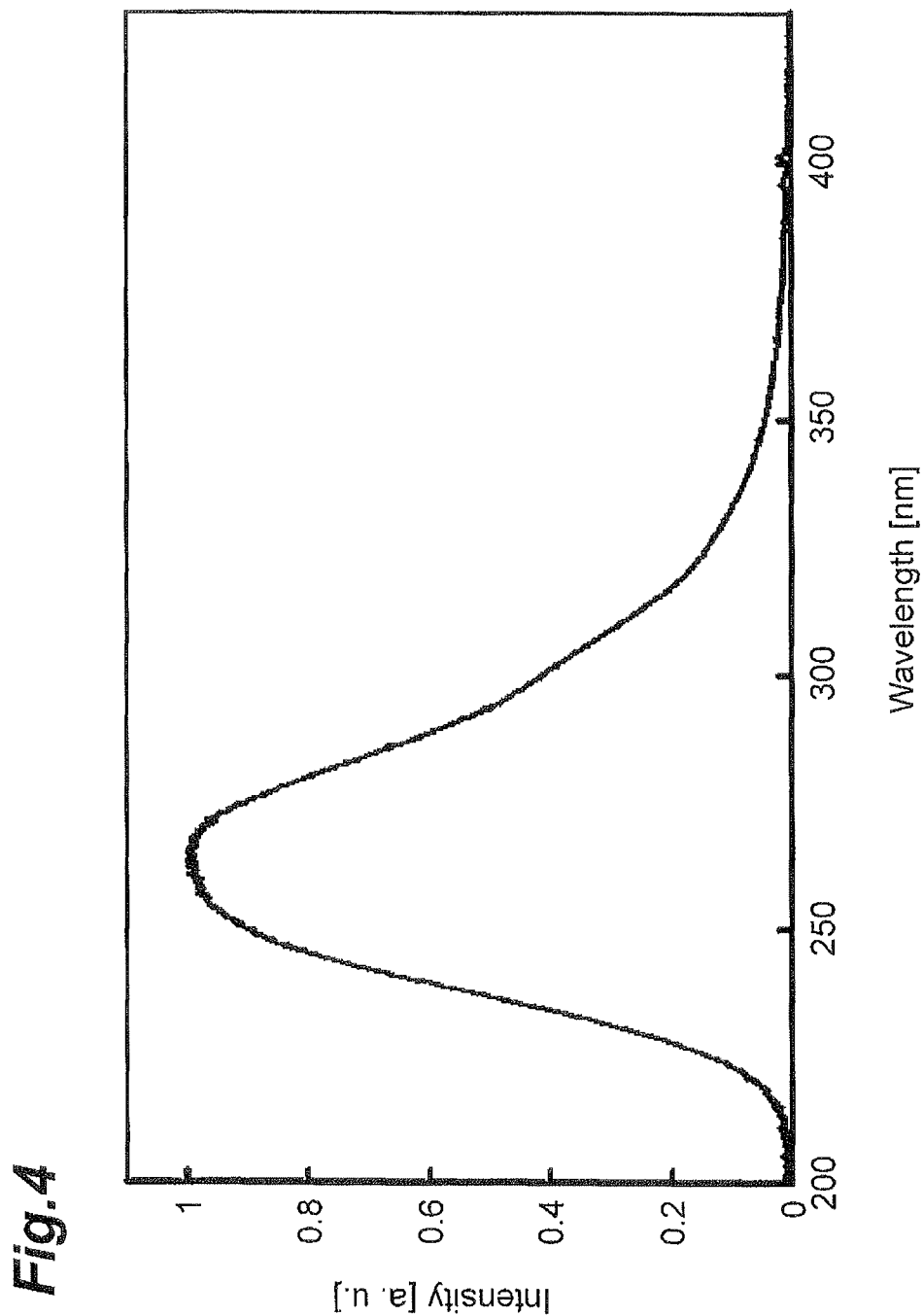
FIG. 4 is a graph illustrating a spectrum of ultraviolet light obtained by irradiating with an electron beam a target for ultraviolet light generation equipped with a light-emitting layer including a powdery or granular La:LuAG single crystal made by an example.
Figure 5:
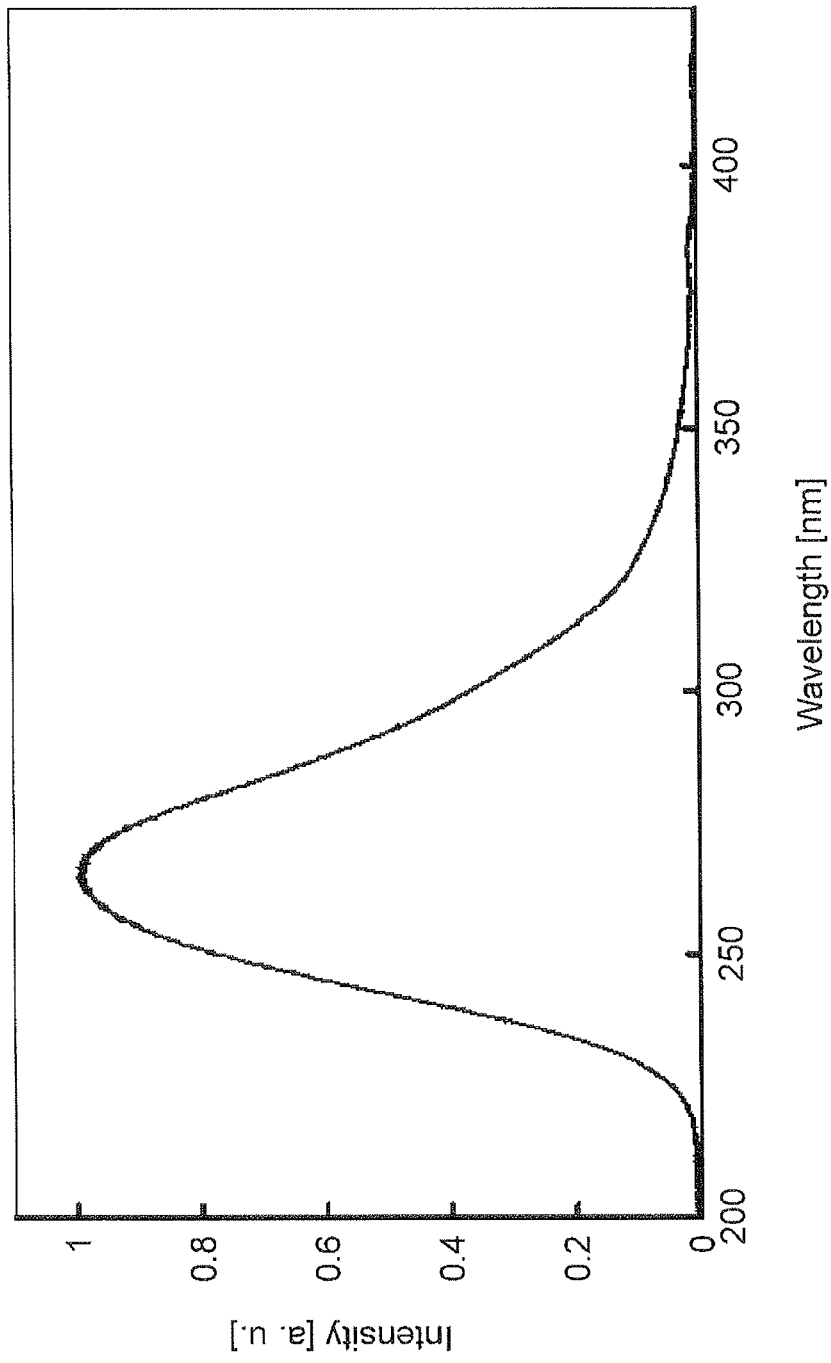
FIG. 5 is a graph illustrating a spectrum of ultraviolet light obtained by irradiating with an electron beam a target for ultraviolet light generation equipped with a light-emitting layer including a powdery or granular Sc:LuAG single crystal made by an example.

FIG. 4 is a graph illustrating a spectrum of ultraviolet light obtained by irradiating with an electron beam a target for ultraviolet light generation equipped with the light-emitting layer including a powdery or granular La:LuAG single crystal made by this example. FIG. 5 is a graph illustrating a spectrum of ultraviolet light obtained by irradiating with an electron beam a target for ultraviolet light generation equipped with the light-emitting layer including a powdery or granular Sc:LuAG single crystal made by this example. In these graphs, the electron beam had an acceleration voltage of 10 kV, an intensity (amperage) of 50 μA, and a diameter of 2 mm.

When planar La:LuAG and Sc:LuAG single crystals are irradiated with the same electron beam, the intensity at the ultraviolet light emission peak wavelength is about 0.2 (in the same unit as with FIGS. 4 and 5). As can be seen from FIGS. 4 and 5, the peak intensity of ultraviolet light generated by irradiation with the electron beam is much higher (i.e., the light emission efficiency is much higher) in the light-emitting layers including the powdery or granular La:LuAG and Sc:LuAG single crystals in accordance with this embodiment than in the planar La:LuAG and Sc:LuAG single crystals. Such effects also seem to be obtained likewise in rare-earth-containing aluminum garnet crystals doped with an activator similar to the La:LuAG and Sc:LuAG single crystals, e.g., Bi:LuAG, La:YAG, and Sc:YAG single crystals.

Figure 6:
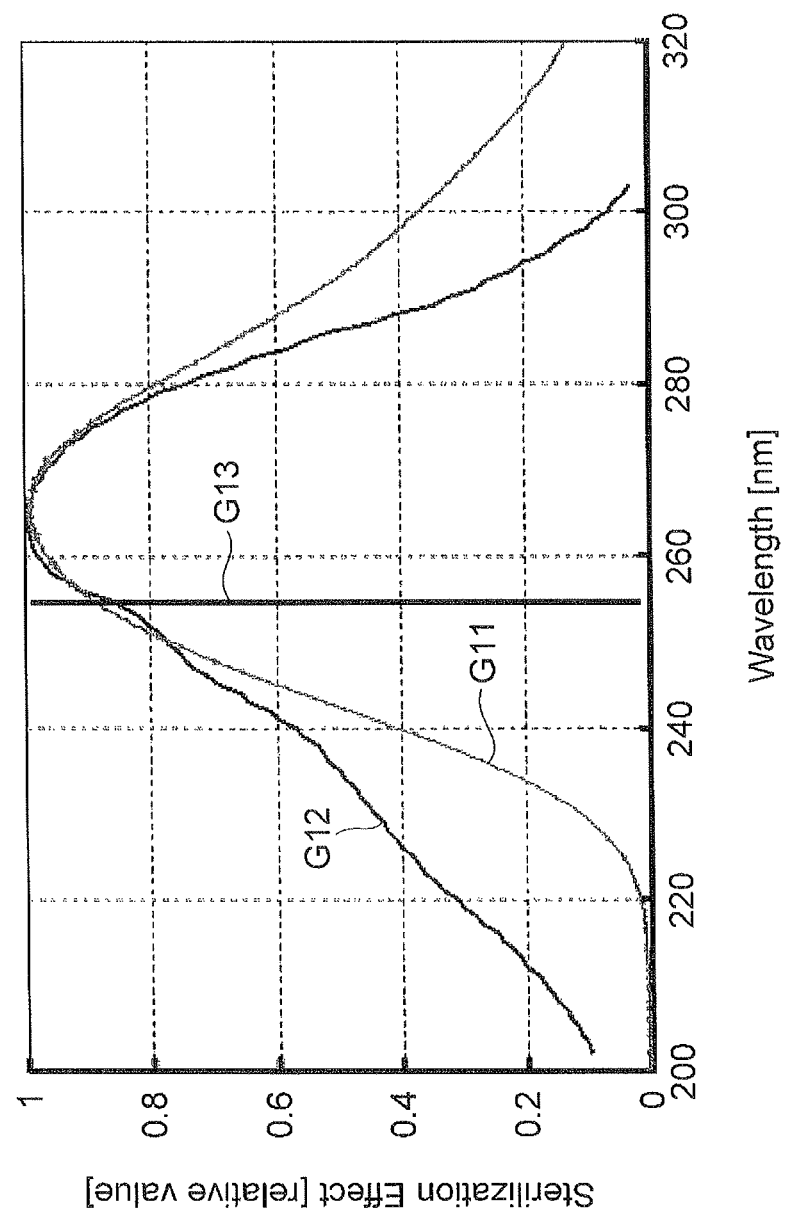
FIG. 6 is a graph illustrating a light emission spectrum of a light-emitting layer including a powdery or granular Sc:LuAG single crystal and a sterilization effect curve of the light-emitting layer as being superposed on each other.

FIG. 6 is a graph illustrating a light emission spectrum of a light-emitting layer including a powdery or granular Sc:LuAG single crystal (graph G11) and a sterilization effect curve of the light-emitting layer (graph G12) as being superposed on each other. FIG. 6 also represents a sterilization curve G13 by a conventional mercury lamp (at a wavelength of 253.7 nm). As illustrated in this graph, the Sc:LuAG single crystal has sterilization effects which are effective in a wide wavelength range from 200 nm to 300 nm. Since the sterilization curve of the conventional mercury lamp does not have a wavelength optimal for sterilization, the light-emitting layer including the powdery or granular Sc:LuAG single crystal can perform sterilization more effectively than the conventional mercury lamp.

Second Example

The second example of the above-mentioned embodiment will now be explained. This example will explain forming of a light-emitting layer with a binder and by heat treatment without binders.

Forming of a Light-Emitting Layer with a Binder

First, a sapphire substrate having a diameter of 12 mm and a thickness of 2 mm was prepared. Subsequently, a Pr:LuAG monocrystalline substrate, which was a rare-earth-containing aluminum garnet crystal doped with Pr as an activator, was prepared and pulverized in a mortar, so as to make a powdery or granular Pr:LuAG single crystal.

Then, the powdery or granular Pr:LuAG single crystal, deionized water, and an aqueous potassium silicate ($K_2SiO_3$) solution and an aqueous barium acetate solution as binder materials were mixed, the mixture was applied onto the sapphire substrate, and the Pr:LuAG single crystal and binder materials were deposited on the sapphire substrate by sedimentation, so as to form a light-emitting layer. Subsequently, an organic film (nitrocellulose) was formed on the light-emitting layer, and an aluminum film was formed by vacuum vapor deposition on the organic film. Finally, the light-emitting layer was fired in the air at 350° C., so as to decompose and vaporize the organic film, thus yielding a structure in which the aluminum film was in contact with the light-emitting layer.

Forming of a Light-Emitting Layer by Heat Treatment

First, a sapphire substrate having a diameter of 12 mm and a thickness of 2 mm was prepared. Subsequently, four LuAG monocrystalline substrates respectively doped with Pr, Sc, La, and Bi as activators were prepared and pulverized in a mortar, so as to attain a powdery or granular form.

Each of the powdery or granular LuAG single crystals containing Pr, Sc, La, and Bi as activators and a solvent (ethanol) were mixed, the resulting liquid mixture was applied onto the sapphire substrate, and then the solvent was dried. The powdery or granular single crystal was thus deposited on the sapphire substrate, so as to form a light-emitting layer. Subsequently, the light-emitting layer was heat-treated (at 1600° C.) in an atmosphere under reduced pressure. The heat treatment was performed in order to melt a surface of the powdery or granular single crystal and yield a structure in which crystal particles were fused to each other and to a surface of the sapphire substrate, thereby enhancing the adhesion of the light-emitting layer. Thereafter, an organic film (nitrocellulose) was formed on the light-emitting layer, and an aluminum film was formed by vacuum vapor deposition on the organic film. Finally, the light-emitting layer was fired in the air at 350° C., so as to decompose and vaporize the organic film, thus yielding a structure in which the aluminum film was in contact with the light-emitting layer.

Figure 7:
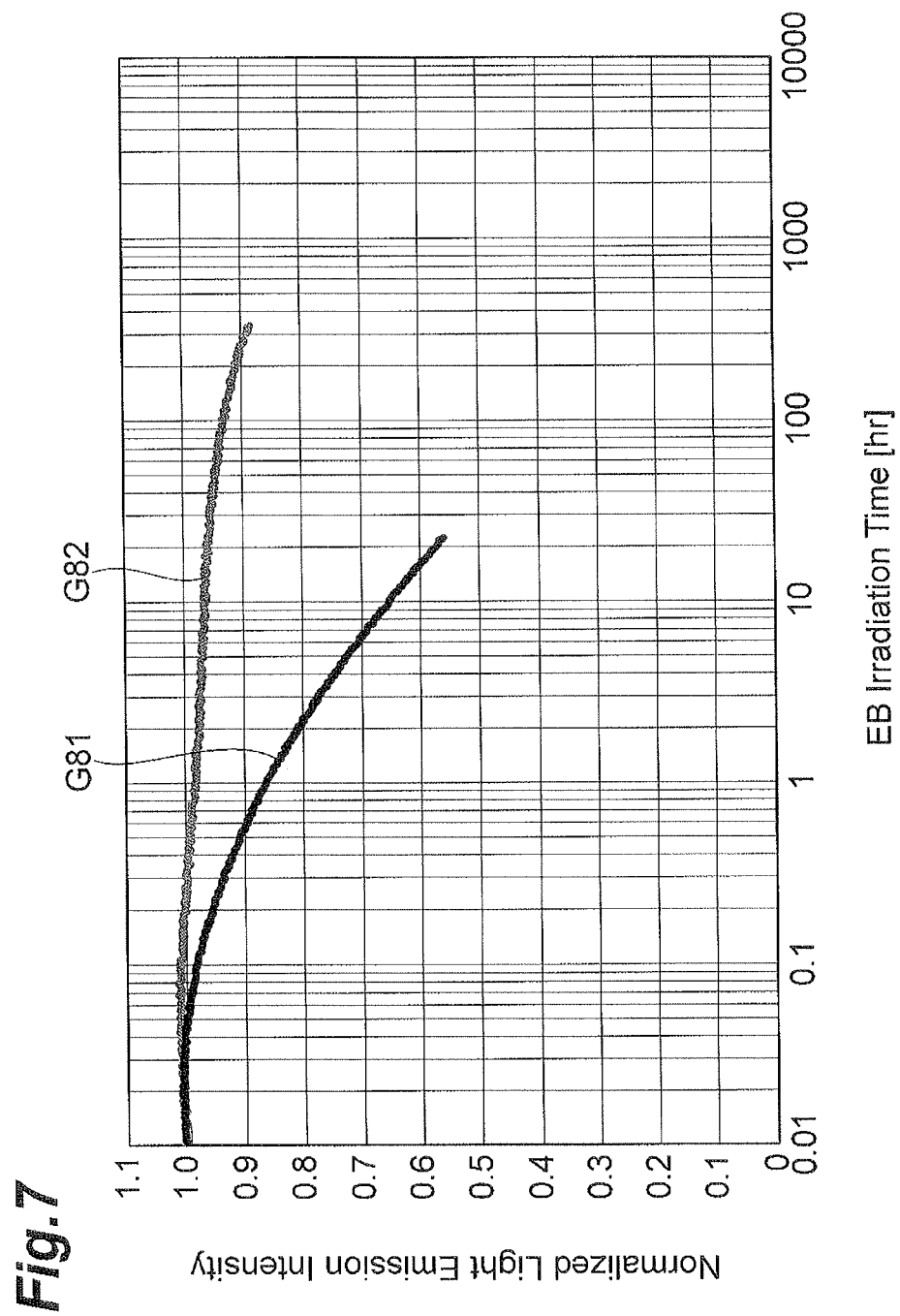
FIG. 7 is a graph illustrating changes with time of light emission intensity in a light-emitting layer (Pr:LuAG) formed with a binder and light emission efficiency in a light-emitting layer formed by heat treatment.

FIG. 7 is a graph illustrating changes with time of light emission intensity in the light-emitting layer formed with a binder and light emission intensity in the light-emitting layer (Pr:LuAG) formed by heat treatment. In FIG. 7, the ordinate indicates normalized light emission intensity (with an initial value of 1.0), while the abscissa indicates electron beam irradiation time (unit: hour) in logarithmic scale. Graphs G81 and G82 represent the light-emitting layer formed with the binder and the light-emitting layer (Pr:LuAG) formed by heat treatment, respectively. In the graphs G81 and G82, the electron beam had an acceleration voltage of 10 kV and an intensity (amperage) of 200 μA.

As illustrated in FIG. 7, the change with time of light emission intensity (decrease in light emission intensity) was smaller in the case of forming the light-emitting layer by heat treatment without binders (graph G82) than in the case with a binder (graph G81). The light-emitting layer contains a binder material in addition to the Pr:LuAG crystal. Irradiating this light-emitting layer with an electron beam having high energy raises its temperature and generates X-rays, whereby the binder material denatures and decomposes under the influence of high temperature and X-rays. It seems that the denatured binder material attached to the crystal surface absorbs ultraviolet light from the crystal, thereby lowering the quantity of light radiated to the outside.

When formed by heat treatment, by contrast, the light-emitting layer contains no binder material, so that no binder material denatures and decomposes, whereby the transmittance for ultraviolet light seems to be maintained for a relatively long time. Therefore, it is desirable for the light-emitting layer to be formed by heat treatment.

Figure 8:
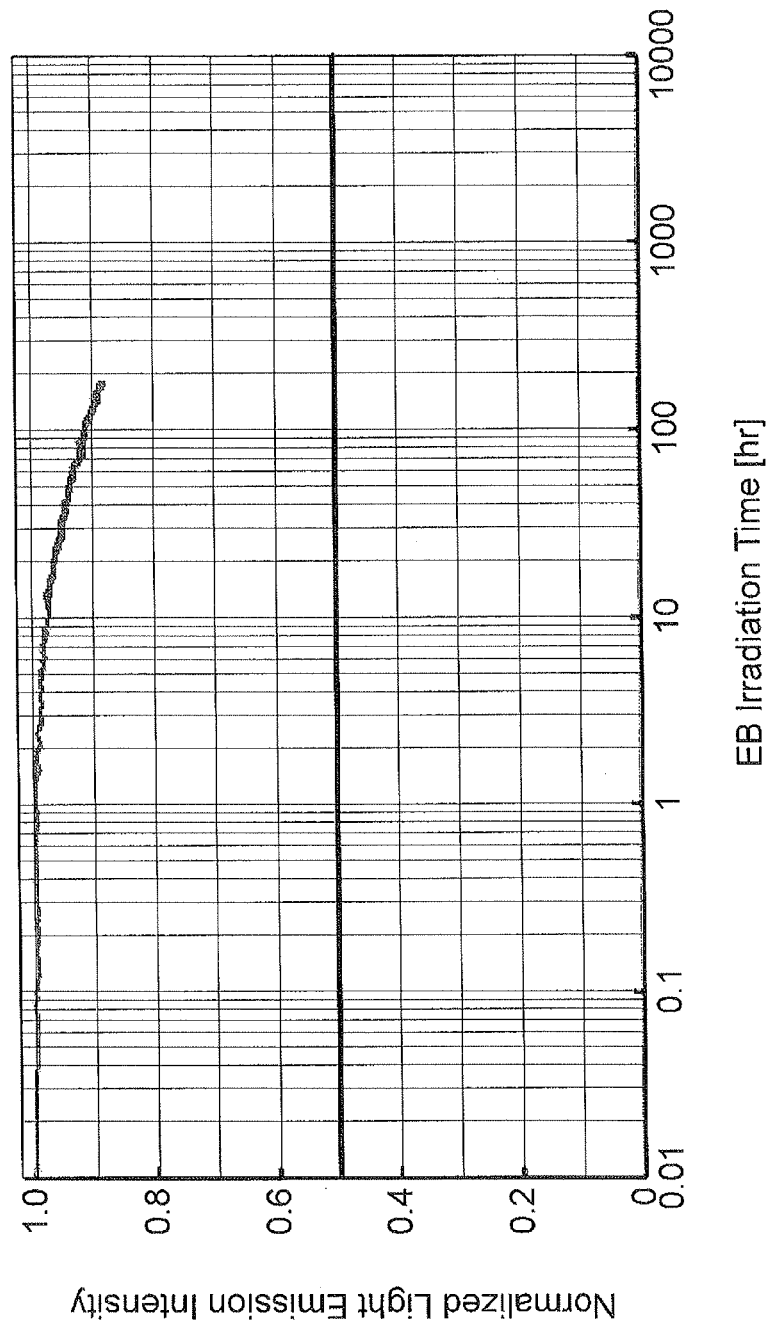
FIG. 8 is a graph illustrating the change with time of light emission intensity when a light-emitting layer including a powdery or granular Sc:LuAG single crystal is heat-treated as in the above.

FIG. 8 is a graph illustrating the change with time of light emission intensity in a light-emitting layer including a powdery or granular Sc:LuAG single crystal heat-treated as mentioned above. In this graph, the electron beam had an acceleration voltage of 10 kV, an intensity (amperage) of 200 μA, and a diameter of 2 mm. As illustrated in FIG. 8, the change with time of light emission intensity (decrease in light emission intensity) is much smaller than the graph G81 of FIG. 7 as with the graph G82 of FIG. 7 also when the activator is Sc. That is, since the light-emitting layer contains no binder material, energy lines different from the ultraviolet light are inhibited from occurring, while no binder material deteriorates, whereby the substrate seems to be restrained from being damaged and keep a transmittance for ultraviolet light for a relatively long time. As illustrated in FIG. 8, this example can attain a life of 200 hr or more and is further expected to have a life of 1000 hr or more. Such effects seem to be obtained likewise in rare-earth-containing aluminum garnet crystals doped with an activator similar to the Pr:LuAG and Sc:LuAG single crystals, e.g., La:LuAG, Bi:LuAG, La:YAG, and Sc:YAG single crystals.

FIGS. 9 to 12 are electron microscope (SEM) photographs capturing states of crystal particles (Sc:LuAG crystal particles) in an active layer after heat treatment when the activator is Sc. FIGS. 13 to 16 are electron microscope (SEM) photographs capturing states of crystal particles (La:LuAG crystal particles) in an active layer after heat treatment when the activator is La. FIGS. 17 to 20 are electron microscope (SEM) photographs capturing states of crystal particles (Bi:LuAG crystal particles) in an active layer after heat treatment when the activator is Bi. In these photographs, (a) illustrates a state before heat treatment, while (b) illustrates a state after heat treatment at the same location as (a). The magnification is 5000× in FIGS. 9 to 20.

It is seen from FIGS. 9 to 20 that the heat-treated crystal particles have their surfaces resolidified after being melted as compared with those before heat treatment. In other words, melted crystal layers resolidified after being melted by heat treatment cover surfaces of the crystal particles in the heat-treated light-emitting layer. The melted crystal layers of the crystal particles adjacent to each other fuse together, so that the crystal particles are firmly joined to each other, whereby the mechanical strength of the light-emitting layer can be enhanced without using the above-mentioned binder.

The above-mentioned melted crystal layers also contribute to binding the crystal particles and the substrate to each other. FIGS. 21 and 22 are electron microscope (SEM) photographs each capturing a surface of a sapphire substrate after peeling a light-emitting layer including Pr:LuAG crystal particles. In these photographs, (a) illustrates a state where a light-emitting layer formed by heat treatment is peeled, while (b) illustrates a state where a light-emitting layer (not heat-treated) formed with a binder is peeled. In this example, the light-emitting layers were removed by strongly rubbing them with Bemcot (registered trademark).

It is seen from FIGS. 21(a) and 22(a) that peeling the light-emitting layer formed by heat treatment cannot completely remove the Pr:LuAG crystal but leaves melted crystal layers of the Pr:LuAG crystal on the surface of the sapphire substrate. On the other hand, it is seen from FIGS. 21(b) and 22(b) that peeling the light-emitting layer (not heat-treated) formed with a binder can completely remove the Pr:LuAG crystal, so that only the surface of the sapphire substrate is photographed. It is inferred from these SEM photographs that, in the light-emitting layer formed by heat treatment, the melted crystal layers fuse to the substrate surface, so that the Pr:LuAG crystal particles and the substrate are joined together more firmly, whereby the light-emitting layer is inhibited from peeling.

The heat treatment temperature for the light-emitting layer, which is 1600° C. in this example, is preferably at least 1400° C. and preferably not higher than 2000° C. The heat treatment temperature of at least 1400° C. makes it possible to form a melted crystal layer with a sufficient thickness on a crystal particle surface and enhance the adhesion between crystal particles and between the crystal particles and substrate, thereby effectively preventing the light-emitting layer from peeling upon electron beam irradiation. The heat treatment temperature not higher than 2000° C. can inhibit the crystal structure from changing, thereby preventing the light emission efficiency from lowering. It can also keep substrates (sapphire substrates in particular) from deforming.

The effects concerning the mechanical strength mentioned above seem to be obtained likewise in rare-earth-containing aluminum garnet crystals doped with an activator similar to the Pr:LuAG single crystal, e.g., La:LuAG, Sc:LuAG, Bi:LuAG, La:YAG, and Sc:YAG single crystals.

Third Example

The third example of the above-mentioned embodiment will now be explained. For studying influences of substrate materials of the target for ultraviolet light generation, a synthetic silica substrate and a sapphire substrate were prepared. As the synthetic silica substrate, a substrate having a diameter of 18.6 mm and a thickness of 1.2 mm was prepared. As the sapphire substrate, a substrate having a diameter of 18 mm and a thickness of 0.43 mm was prepared. On each of these substrates, a light-emitting layer including a powdery or granular Pr:LuAG single crystal and an aluminum film were made as in the first example.

Figure 23:
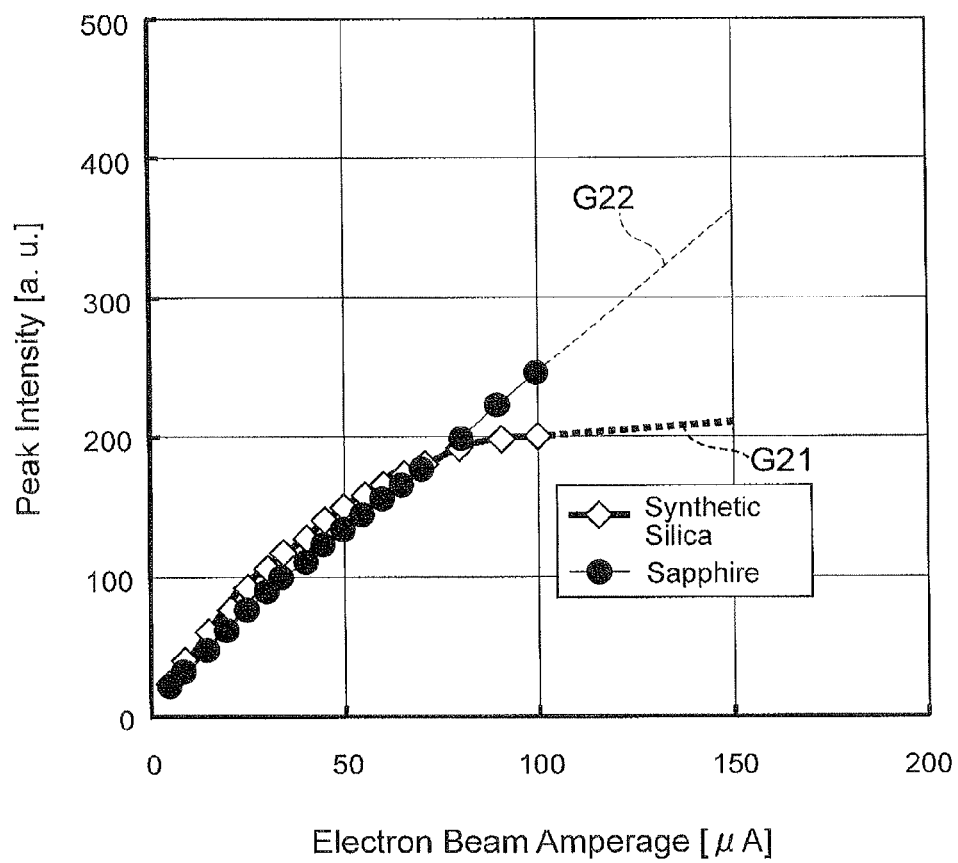
FIG. 23 is a graph illustrating the relationship between amperage and ultraviolet light peak intensity when irradiating a light-emitting layer made on each substrate with an electron beam in a third example.

FIG. 23 is a graph illustrating the relationship between amperage and ultraviolet light peak intensity when irradiating the light-emitting layer made on each substrate with an electron beam. In FIG. 23, graph G21 is a graph concerning the light-emitting layer made on the synthetic silica substrate. Graph G22 is a graph concerning the light-emitting layer made on the sapphire substrate. As illustrated in FIG. 23, the light-emitting layer made on the synthetic silica substrate lowered the rate of increase of light emission intensity as amperage rose. By contrast, the light-emitting layer made on the sapphire substrate did not lower the rate of increase and exhibited a favorable linearity. Such results seem to derive from the fact that thermal conductivity is better in the sapphire substrate than in the synthetic silica substrate.

The above-mentioned effects in this example seem to be the same in rare-earth-containing aluminum garnet crystals doped with an activator similar to the Pr:LuAG single crystal, e.g., La:LuAG, Sc:LuAG, Bi:LuAG, La:YAG, and Sc:YAG single crystals.

Fourth Example

Figure 24:
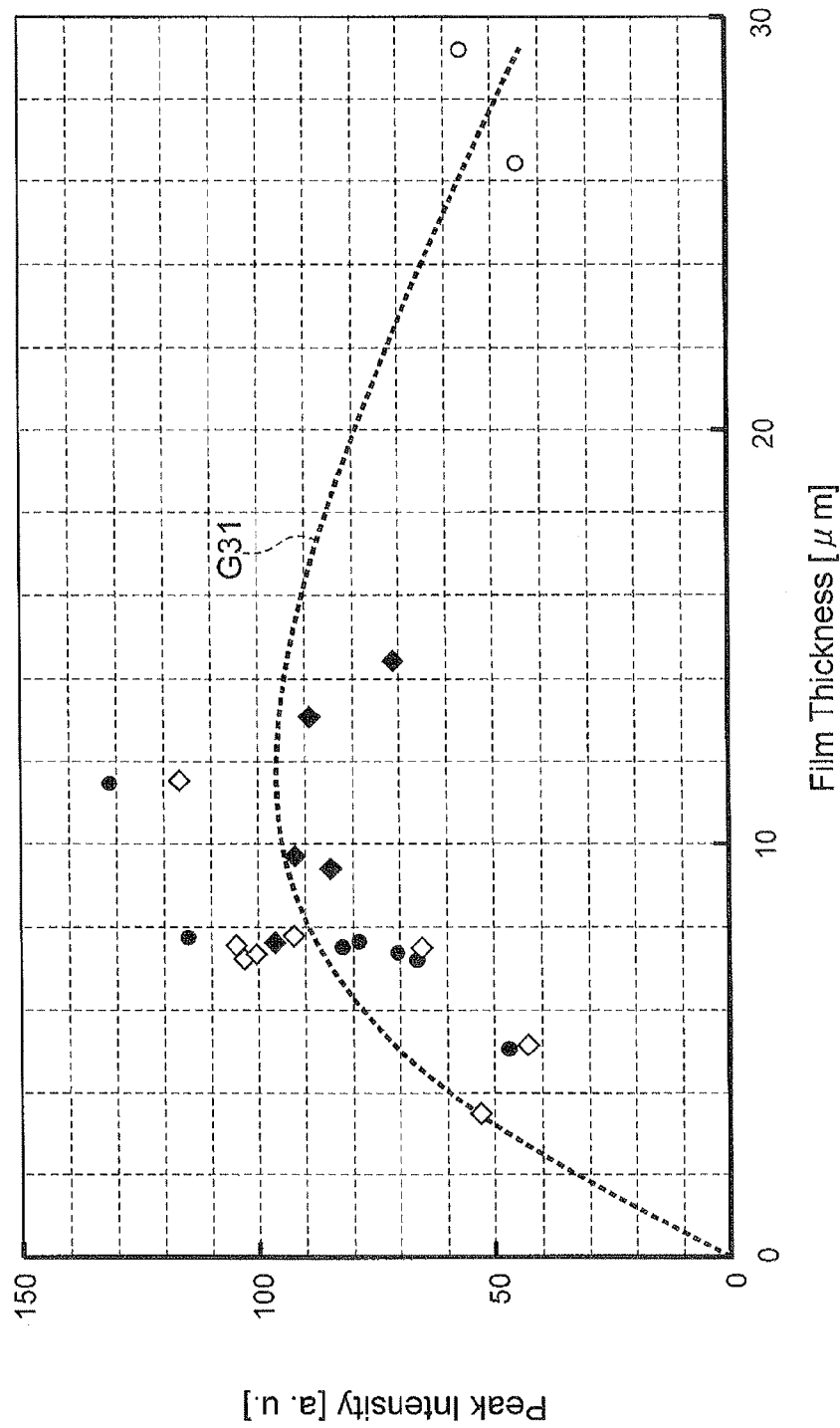
FIG. 24 is a graph illustrating the relationship between the light-emitting layer thickness and ultraviolet light peak intensity in a fourth example.

The fourth example of the above-mentioned embodiment will now be explained. In this example, a target for ultraviolet light generation was made by the same method as with the first example, and an experiment concerning the relationship between the light-emitting layer thickness and the ultraviolet light peak intensity was performed. That is, powdery or granular Pr:LuAG crystals were deposited with various thicknesses so as to make light-emitting layers, the peak intensity of ultraviolet light generated upon irradiation of the light-emitting layers with an electron beam was measured, and then cross sections of the light-emitting layers were observed with SEM, so as to determine their thicknesses. FIG. 24 is a graph illustrating the resulting relationship between the light-emitting layer thickness and the ultraviolet light peak intensity. Curve G31 in the graph is a fitted curve. In FIG. 24, the electron beam had an acceleration voltage of 10 kV, an intensity (amperage) of 50 µA, and a diameter of 2 mm.

Referring to FIG. 24, when the thickness of the light-emitting layer is smaller than a certain value (about 12 µm), the peak intensity of ultraviolet light is higher as the light-emitting layer is thicker, thereby enhancing the light emission efficiency. When the thickness of the light-emitting layer exceeds this value, however, the peak intensity of ultraviolet light decreases instead. It is also seen from this graph that the thickness of the light-emitting layer is preferably at least 0.5 µm but not more than 30 µm, more preferably at least 6 µm but not more than 20 µm, in order to obtain a sufficiently practical ultraviolet light intensity (light emission efficiency).

The above-mentioned results in this example seem to be obtained likewise in rare-earth-containing aluminum garnet crystals doped with an activator similar to the Pr:LuAG single crystal, e.g., La:LuAG, Sc:LuAG, Bi:LuAG, La:YAG, and Sc:YAG single crystals.

Fifth Example

Figure 25:
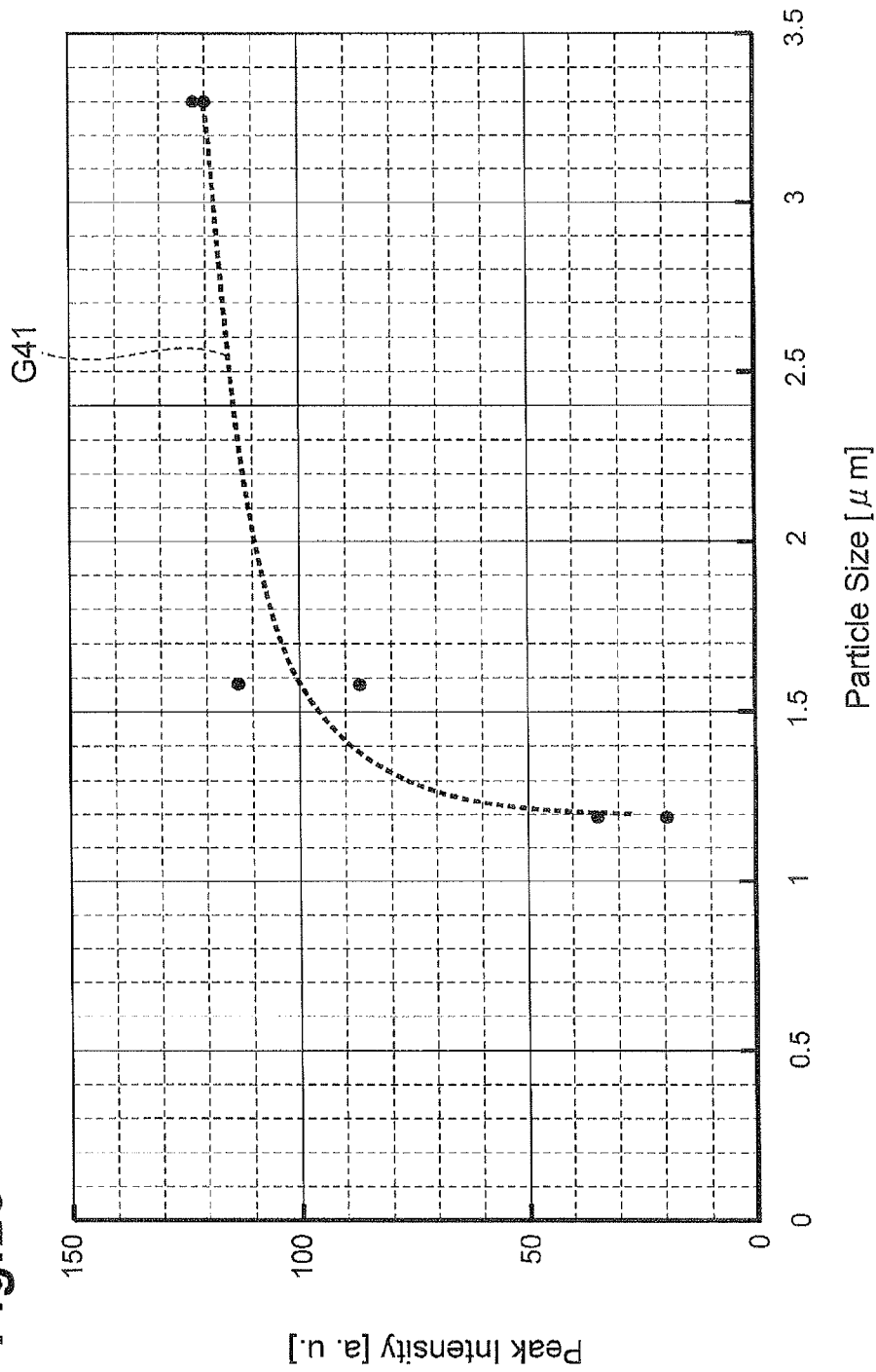
FIG. 25 is a graph illustrating the relationship between the median diameter of the Pr:LuAG crystal and the ultraviolet light peak intensity in a fifth example.

The fifth example of the above-mentioned embodiment will now be explained. This example conducted an experiment concerning the relationship between the median diameter of a powdery or granular Pr:LuAG crystal contained in the light-emitting layer and the ultraviolet light peak intensity. That is, the powdery or granular Pr:LuAG crystal was deposited on a plurality of substrates, so as to make light-emitting layers, and the peak intensity of ultraviolet light generated upon irradiation of the light-emitting layers with an electron beam was measured. The median diameter of the Pr:LuAG crystal included in the light-emitting layer was measured with a particle size analyzer before deposition on the substrate. FIG. 25 is a graph illustrating the resulting relationship between the median diameter of the Pr:LuAG crystal and the ultraviolet light peak intensity. Curve G41 in the graph is a fitted curve. In FIG. 25, the electron beam had an acceleration voltage of 10 kV, an intensity (amperage) of 70 µA, and a diameter of 2 mm.

It is seen from FIG. 25 that the ultraviolet light peak intensity is higher as the median diameter of the Pr:LuAG crystal is greater, thereby enhancing the light emission efficiency. However, the rate of increase in ultraviolet light peak intensity is suppressed when the median diameter of the Pr:LuAG crystal exceeds 1.6 µm. It is also seen from this graph that a sufficiently practical ultraviolet light intensity (light emission efficiency) is obtained when the median diameter of the Pr:LuAG crystal is 0.5 µm or greater. When the median diameter of the Pr:LuAG crystal is smaller than 0.5 µm, the light emission efficiency seems to decrease because of the following reasons (1) to (3). (1) While the light emitted by the light-emitting layer is scattered by the Pr:LuAG crystal particles, the scattering by the crystal particles increases when the median diameter of the Pr:LuAG crystal is smaller than 0.5 µm, thereby lowering the ratio of light outputted through the light-transmitting layer. (2) Since the defect density is higher in the vicinity of surfaces of the Pr:LuAG crystal particles than within the particles, the light emission efficiency is higher in the vicinity of particle surfaces than within the particles. When the Pr:LuAG crystal has a fixed total volume, its surface area becomes greater as the Pr:LuAG crystal particles have a smaller particle size. Therefore, when the median diameter of the Pr:LuAG crystal is smaller than 0.5 µm, a part having a high defect density and a low light emission efficiency becomes greater, thereby lowering the light emission efficiency. (3) When the median diameter of the Pr:LuAG crystal is smaller than 0.5 µm, the heat radiation efficiency at the time of irradiation with electron beams becomes lower, thereby raising the temperature of the Pr:LuAG crystal and lowering the light emission efficiency.

The median diameter of the Pr:LuAG crystal is preferably 30 µm or less. The fact that the median diameter of the Pr:LuAG crystal is 30 µm or less can inhibit the Pr:LuAG crystal from peeling from the substrate when depositing the Pr:LuAG crystal on the substrate.

The above-mentioned results in this example seem to be obtained likewise in rare-earth-containing aluminum garnet crystals doped with an activator similar to the Pr:LuAG single crystal, e.g., La:LuAG, Sc:LuAG, Bi:LuAE La:YAG, and Sc:YAG single crystals.

Sixth Example

The sixth example of the above-mentioned embodiment will now be explained. First, in this example, a polycrystalline plate containing 0.7 atom % of Pr was made. Subsequently, this polycrystalline plate was pulverized in a mortar, so as to produce a powdery or granular Pr:LuAG polycrystal. Then, the powdery or granular Pr:LuAG polycrystal was deposited on a synthetic silica substrate by sedimentation, so as to form a light-emitting layer. Thereafter, an organic film (nitrocellulose) was formed on the light-emitting layer, and an aluminum film was vapor-deposited on the organic film. Finally, the light-emitting layer was fired, so as to decompose and vaporize the organic film, thus yielding a structure in which the aluminum film was in contact with the light-emitting layer. The thickness of the light-emitting layer after firing was 10 μm.

Figure 26:
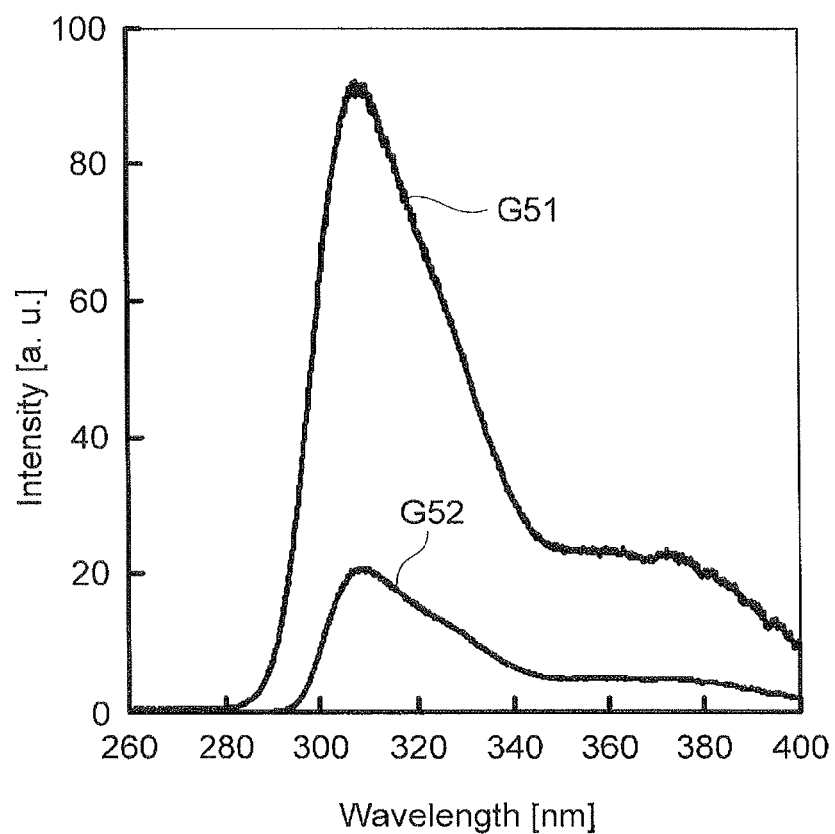
FIG. 26 is a graph illustrating spectra of ultraviolet light obtained by irradiating with an electron beam the target for ultraviolet generation made by a sixth example.

Graph G51 in FIG. 26 illustrates a spectrum of ultraviolet light obtained by irradiating with an electron beam the target made by this example. FIG. 26 also plots graph G52 for comparison. The graph G52 is a spectrum of ultraviolet light obtained by irradiating with an electron beam a Pr:LuAG polycrystalline plate having an aluminum film vapor-deposited on a surface. As can be seen from FIG. 26, the peak intensity of ultraviolet light occurring upon irradiation with the electron beam is much greater (i.e., light emission efficiency is much higher) in the light-emitting layer of this example including the powdery or granular Pr:LuAG polycrystal than in the Pr:LuAG polycrystalline plate.

The above-mentioned results in this example seem to be obtained likewise in rare-earth-containing aluminum garnet crystals doped with an activator similar to the Pr:LuAG single crystal, e.g., La:LuAG, Sc:LuAG, Bi:LuAG, La:YAG, and Sc:YAG single crystals.

Seventh Example

The seventh example of the above-mentioned embodiment will now be explained. This example performed an experiment concerning the light-emitting layer thickness and the ultraviolet light peak intensity when the powdery or granular Pr:LuAG crystal contained in the light-emitting layer had various median diameter values. That is, Pr:LuAG crystals having respective median diameters of 0.5 μm, 1.0 μm, 6.5 μm, and 30 μm were deposited, a plurality of light-emitting layers having different thicknesses were made at each median diameter, these light-emitting layers were irradiated with an electron beam, and the peak intensity of ultraviolet light generated thereby was measured. The median diameter of the Pr:LuAG crystal included in each light-emitting layer was measured with a particle size analyzer before deposition on the substrate.

Figure 27:
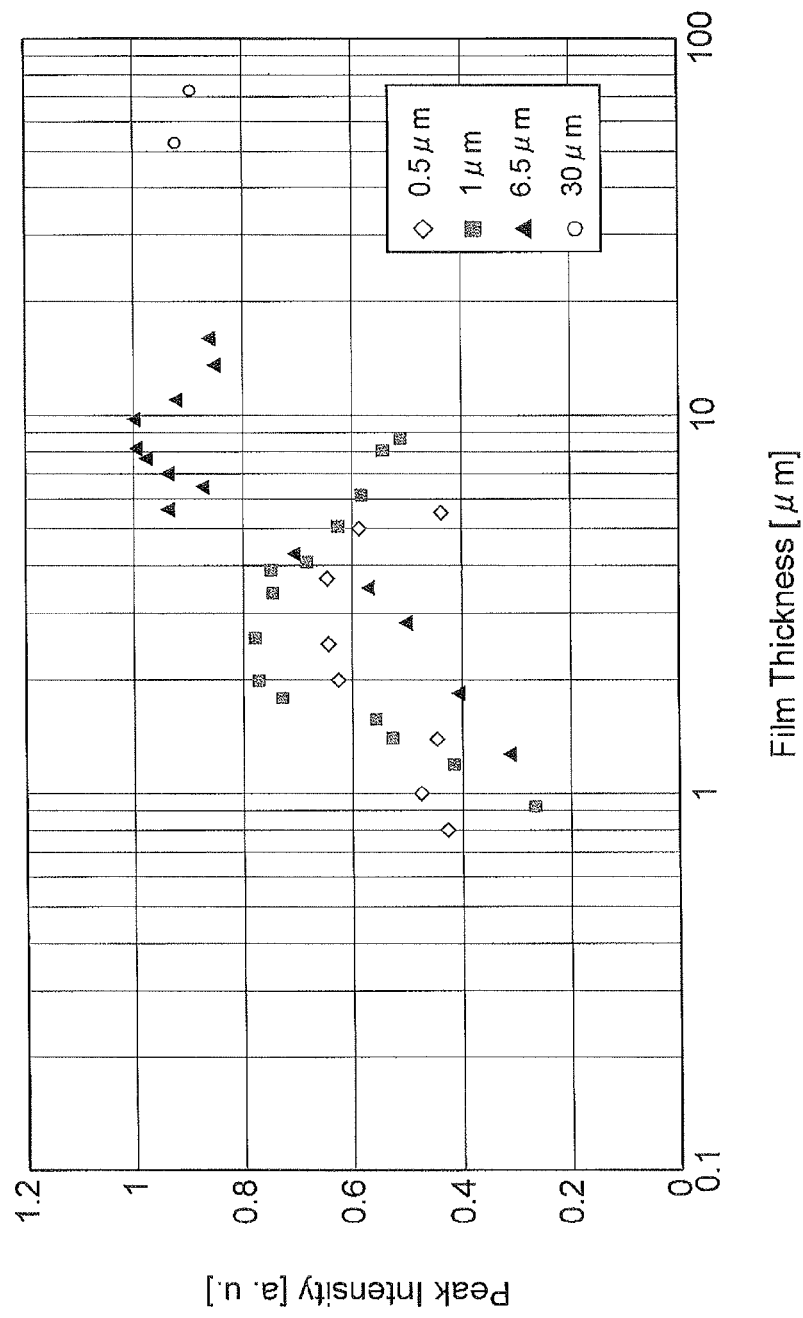
FIG. 27 is a graph plotting measurement results with its ordinate and abscissa indicating the peak intensity and light-emitting layer thickness (in logarithmic scale), respectively.
Figure 28:
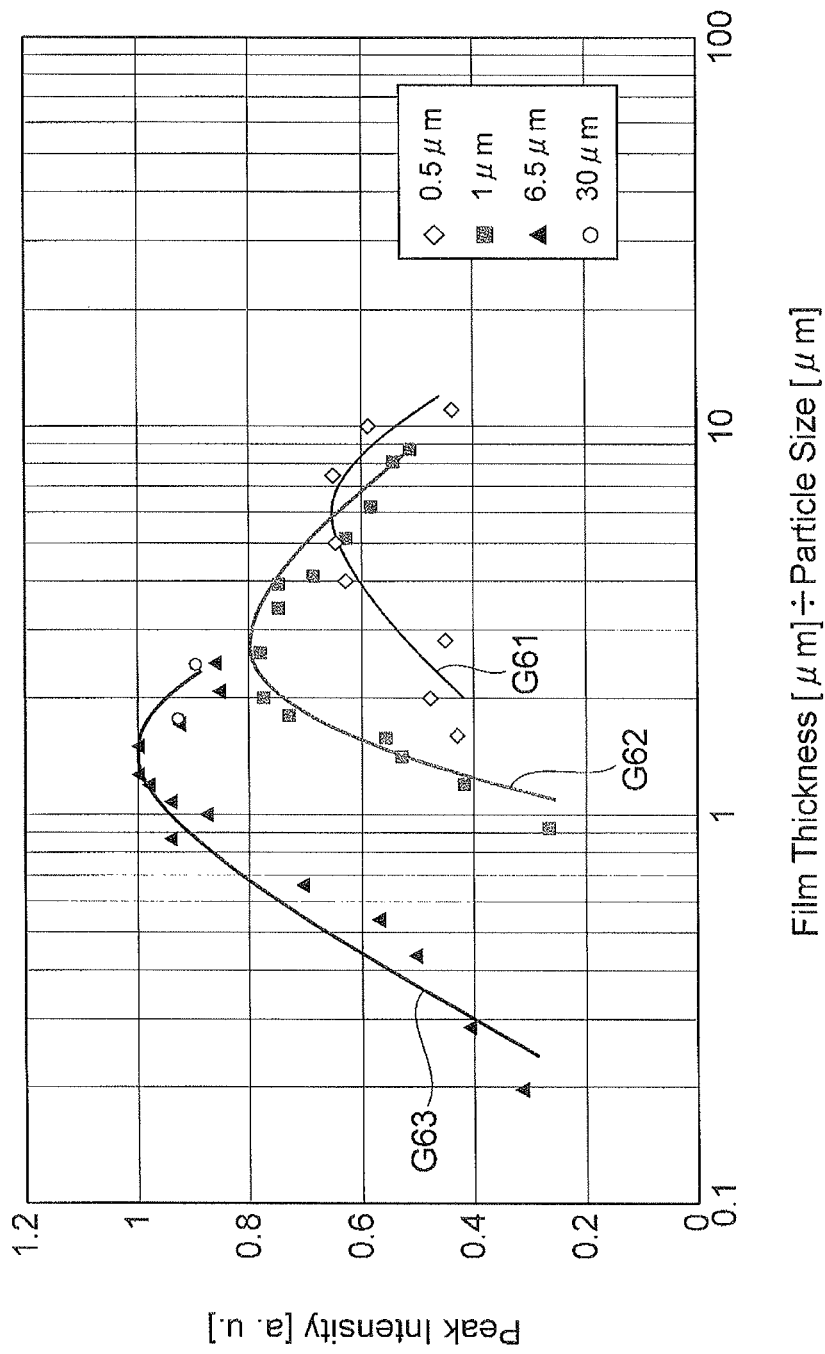
FIG. 28 is a graph representing the film thickness divided by the median diameter on its abscissa (in logarithmic scale)

FIG. 27 is a graph plotting the results with its ordinate and abscissa indicating the peak intensity and light-emitting layer thickness (in logarithmic scale), respectively. FIG. 28 is a graph representing the film thickness divided by the median diameter (i.e., the number of stacked layers of Pr:LuAG crystal particles) on its abscissa (in logarithmic scale), in which curves G61, G62, and G63 are fitted curves at the median diameters of 0.5 μm, 1.0 μm, and 6.5 μm, respectively. FIGS. 29(a) to 29(c) are diagrams schematically illustrating Pr:LuAG crystal particles 22a deposited on the substrate 21.

It is seen from FIGS. 27 and 28 that the thickness at which the peak intensity is high (i.e., the light emission efficiency is high) varies depending on the median diameter of the Pr:LuAG crystal. That is, when the median diameter of the Pr:LuAG crystal is 0.5 μm, the thickness at which the ultraviolet light peak intensity is the highest is 3 μm, and the number of stacked layers is 6 at this time (FIG. 29(a)). Then, the thickness range where a sufficiently practical peak intensity is obtained is at least 0.5 μm but not more than 5 μm. When the median diameter of the Pr:LuAG crystal is 1.0 μm, the thickness at which the ultraviolet light peak intensity is the highest is 3 μm, and the number of stacked layers is 3 at this time (FIG. 29(b)). Then, the thickness range where a sufficiently practical peak intensity is obtained is at least 1 μm but not more than 10 μm. When the median diameter of the Pr:LuAG crystal is 6.5 μm, the thickness at which the ultraviolet light peak intensity is the highest is 10 μm, and the number of stacked layers is about 1.5 at this time (FIG. 29(c)). Then, the thickness range where a sufficiently practical peak intensity is obtained is at least 3 μm but not more than 30 μm.

As mentioned above, the decrease in light emission efficiency when the light-emitting layer becomes thicker is more remarkable as the median diameter of the Pr:LuAG crystal is smaller. This seems to result from the fact that the light-emitting layer lowers its transmittance for ultraviolet light as the number of stacked layers of Pr:LuAG crystal particles increases. At any median diameter, the light emission efficiency decreases when the thickness of the light-emitting layer becomes smaller than a certain value. This seems to result from the fact that the coverage of the substrate surface by the Pr:LuAG crystal decreases as the light-emitting layer becomes thinner. At any median diameter, the coverage at which the ultraviolet light peak intensity is the highest is 100%.

Figure 30:
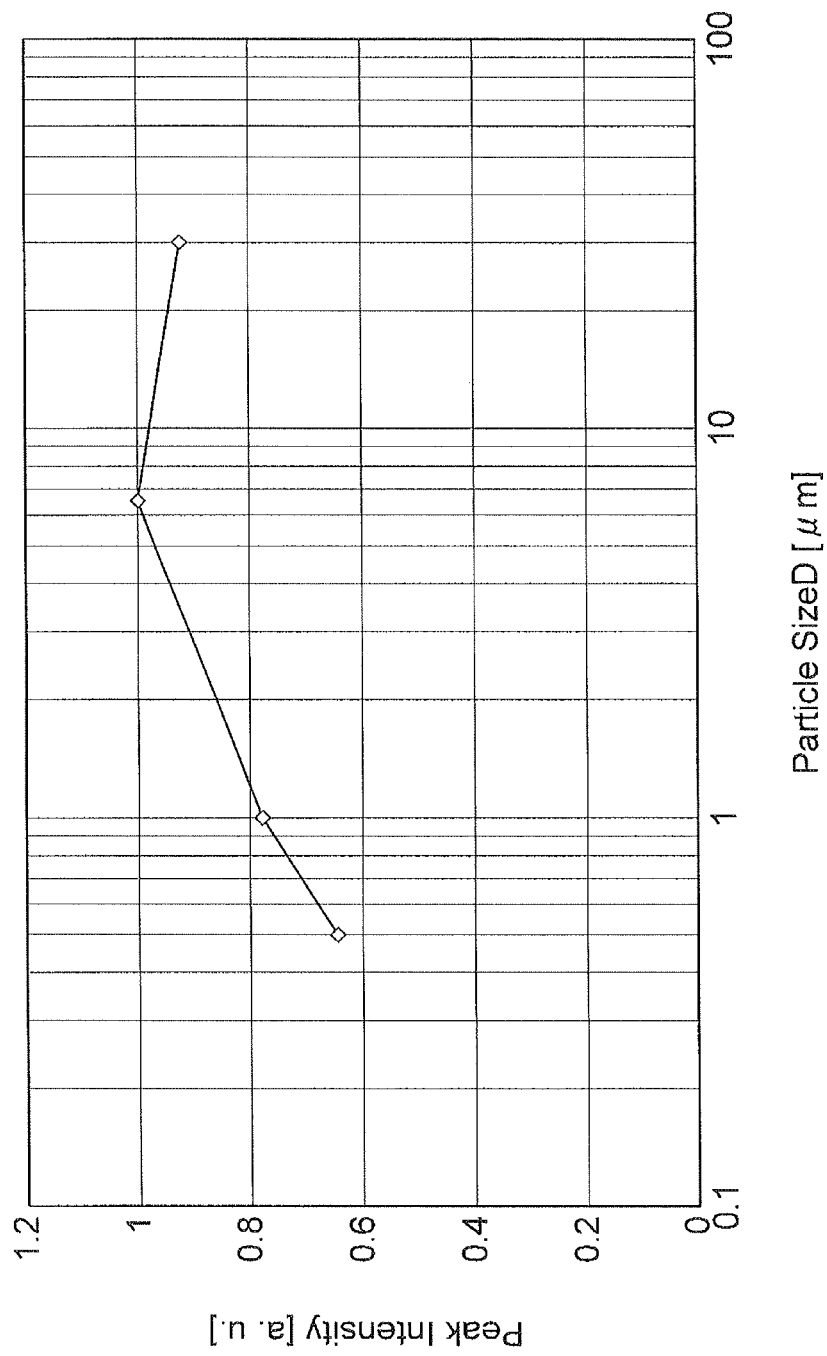
FIG. 30 is a graph illustrating the relationship between the light-emitting layer thickness and ultraviolet light peak intensity in a seventh example.

FIG. 30 is a graph illustrating the relationship between the light-emitting layer thickness and ultraviolet light peak intensity in this example. Referring to FIG. 30, when the median diameter of the Pr:LuAG crystal is smaller than 6.5 μm, the ultraviolet light peak intensity becomes higher as the median diameter is greater, thereby enhancing the light emission efficiency. When the median diameter exceeds 6.5 μm, however, the ultraviolet light peak intensity decreases instead. It is seen from this graph that a favorable median diameter range for enhancing the ultraviolet light emission efficiency is at least 0.5 μm but not more than 100 μm. However, a practically preferred median diameter range is at least 0.5 μm but not more than 30 μm, since the Pr:LuAG crystal particles tend to weaken their adhesion to the substrate and peel therefrom when the median diameter exceeds 30 μm.

The above-mentioned results in this example seem to be obtained likewise in rare-earth-containing aluminum garnet crystals doped with an activator similar to the Pr:LuAG single crystal, e.g., La:LuAG, Sc:LuAG, Bi:LuAG, La:YAG, and Sc:YAG single crystals.

The target for ultraviolet light generation, electron-beam-excited ultraviolet light source, and method for manufacturing a target for ultraviolet light generation in accordance with one aspect of the present invention are not limited to the embodiment mentioned above, but can be modified in various ways. For example, the aluminum film, which is vapor-deposited on the light-emitting layer in each of the above-mentioned embodiment and examples, may be omitted. The aluminum film functions as an antistatic conductive film, for which conductive films made of materials other than aluminum may also be used.

INDUSTRIAL APPLICABILITY

The target for ultraviolet light generation, electron-beam-excited ultraviolet light source, and method for manufacturing a target for ultraviolet light generation in accordance with one aspect of the present invention can enhance ultraviolet light generation efficiency.

REFERENCE SIGNS LIST

10: electron-beam-excited ultraviolet light source; 11: envelope; 12: electron source; 13: extraction electrode; 16:

power supply part; 20: target for ultraviolet light generation; 21: substrate; 21*a*: principal surface; 21*b*: rear face; 22: light-emitting layer; 23: aluminum film; EB: electron beam; UV: ultraviolet light.

The invention claimed is:

1. A target for ultraviolet light generation comprising:
   a substrate adapted to transmit ultraviolet light therethrough; and
   a light-emitting layer disposed on the substrate and generating ultraviolet light in response to an electron beam;
   wherein the light-emitting layer includes a powdery or granular rare-earth-containing aluminum garnet crystal doped with an activator, the light-emitting layer having an ultraviolet light emission peak wavelength of 300 nm or shorter.

2. A target for ultraviolet light generation according to claim 1, wherein the rare-earth-containing aluminum garnet crystal has a surface covered with a melted crystal layer resolidified after being melted by heat treatment.

3. A target for ultraviolet light generation according to claim 2, wherein the melted crystal layer fuses the rare-earth-containing aluminum garnet crystals to each other and to the substrate.

4. A target for ultraviolet light generation according to claim 1, wherein the activator is a rare-earth element.

5. A target for ultraviolet light generation according to claim 1, wherein the rare-earth-containing aluminum garnet crystal is LuAG, the activator being at least one of Sc, La, and Bi.

6. A target for ultraviolet light generation according to claim 1, wherein the rare-earth-containing aluminum garnet crystal is YAG, the activator being at least one of Sc and La.

7. A target for ultraviolet light generation according to claim 1, wherein the light-emitting layer has a thickness of at least 0.5 μm but not more than 30 μm.

8. A target for ultraviolet light generation according to claim 1, wherein the rare-earth-containing aluminum garnet crystal has a median diameter of at least 0.5 μm but not more than 30 μm.

9. A target for ultraviolet light generation according to claim 1, wherein the substrate is constituted by sapphire, silica, or rock crystal.

10. An electron-beam-excited ultraviolet light source comprising:
    the target for ultraviolet light generation according to claim 1; and
    an electron source providing the target with the electron beam.

11. A method for manufacturing a target for ultraviolet light generation, the method comprising depositing a powdery or granular rare-earth-containing aluminum garnet crystal, doped with an activator, having an ultraviolet light emission peak wavelength of 300 nm or shorter on a substrate adapted to transmit ultraviolet light therethrough and heat-treating the rare-earth-containing aluminum garnet crystal, so as to melt and then resolidify a surface of the rare-earth-containing aluminum garnet crystal to form a melted crystal layer.

12. A method for manufacturing a target according to claim 11, wherein the heat-treatment temperature is at least 1400° C. but not higher than 2000° C.

* * * * *